United States Patent
Ushijima

(10) Patent No.: US 7,834,726 B2
(45) Date of Patent: Nov. 16, 2010

(54) MODULE FOR PARALLEL LIGHTING AND BALANCER COIL FOR DISCHARGE LAMP

(75) Inventor: Masakazu Ushijima, 30-24 Nogata, 6-chome, Nakano-ku, Tokyo (JP) 165-0027

(73) Assignees: Masakazu Ushijima, Tokyo (JP); Hong-Fei Chen, Taichung (TW)

( * ) Notice: Subject to any disclaimer, the term of this patent is extended or adjusted under 35 U.S.C. 154(b) by 147 days.

(21) Appl. No.: 12/292,943

(22) Filed: Dec. 1, 2008

(65) Prior Publication Data

US 2009/0153069 A1 Jun. 18, 2009

Related U.S. Application Data

(62) Division of application No. 11/214,765, filed on Aug. 31, 2005, now Pat. No. 7,479,740.

(30) Foreign Application Priority Data

| Sep. 1, 2004 | (JP) | ............................. 2004-254129 |
| Dec. 1, 2004 | (JP) | ............................. 2004-348380 |
| Apr. 15, 2005 | (JP) | ............................. 2005-117996 |

(51) Int. Cl.
H01F 7/08 (2006.01)
(52) U.S. Cl. ..................... 335/226; 335/224; 335/222; 335/221; 335/209
(58) Field of Classification Search ................ 335/226, 335/224, 222, 221, 220, 213, 212, 211, 209; 315/274–282
See application file for complete search history.

(56) References Cited

U.S. PATENT DOCUMENTS

| 4,572,990 | A | 2/1986 | Leale et al. |
| 6,226,196 | B1 | 5/2001 | Toshinari et al. |
| 6,310,444 | B1 | 10/2001 | Chang |
| 6,459,216 | B1 | 10/2002 | Tsai et al. |
| 6,717,372 | B2 | 4/2004 | Lin et al. |
| 7,282,868 | B2 | 10/2007 | Ushijima et al. |
| 2002/0125838 | A1 | 9/2002 | Tsai |
| 2002/0140538 | A1 | 10/2002 | Yer et al. |
| 2003/0141829 | A1 | 7/2003 | Yu et al. |
| 2004/0155596 | A1 | 8/2004 | Ushijima et al. |
| 2004/0183448 | A1 | 9/2004 | Hsueh et al. |

(Continued)

FOREIGN PATENT DOCUMENTS

CN    521947 A    12/2001

(Continued)

Primary Examiner—Tuyet Thi Vo
(74) Attorney, Agent, or Firm—Birch, Stewart, Kolasch & Birch, LLP

(57) ABSTRACT

A small balancer coil for cold-cathode florescent lamps having sufficient shunt/balance effects, comprises a discharge lamp, a conductor located close to the discharge lamp, and two coils whose magnetic fluxes face each other. The magnetic fluxes generated in the coils face and cancel each other. Lamp currents of the discharge lamps are balanced by making the sum of the reactances of the mutual inductance of the balancer coil larger than the negative resistance of the discharge lamp. Section winding is applied to each coil of the balancer coil so as to maintain shunt and balance effects even in a small/flat balancer coil by making self-resonance frequency of each of the coils higher.

4 Claims, 35 Drawing Sheets

U.S. PATENT DOCUMENTS

| | | |
|---|---|---|
| 2005/0093471 A1 | 5/2005 | Jin |
| 2005/0093472 A1 | 5/2005 | Jin |
| 2005/0218827 A1 | 10/2005 | Ushijima et al. |
| 2006/0279232 A1 | 12/2006 | Takahama et al. |

FOREIGN PATENT DOCUMENTS

| | | |
|---|---|---|
| EP | 1 397 028 A1 | 3/2004 |
| JP | 7-45393 A | 2/1995 |
| JP | 3-291852 B2 | 3/2002 |
| JP | 2002-164193 A | 6/2002 |
| JP | 2005-317253 A | 11/2005 |
| TW | 153102 | 3/2002 |
| TW | 521 947 Y | 2/2003 |
| TW | 594 808 B | 6/2004 |

FIG. 1
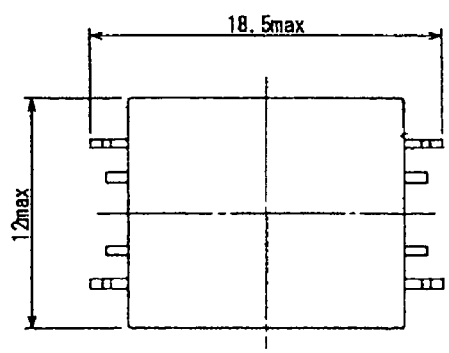
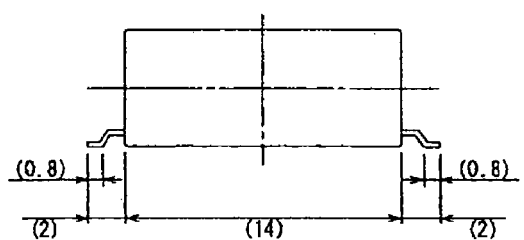 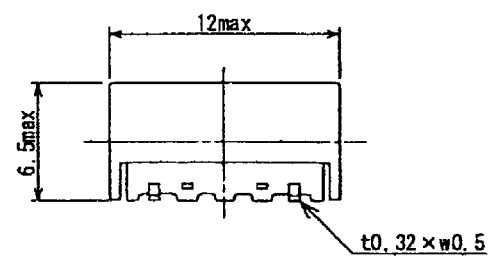
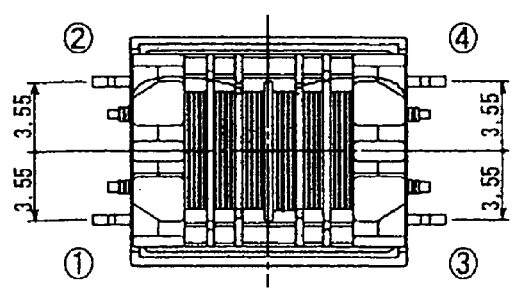

10 Lamps

12 Lamps

14 Lamps $k_n$: series capacitance between disc (n) and disc (n+1)
$c_n$: capacitance to ground of disc (n)
$M_{ns}$: mutual inductance between disc (n) and disc (s)

FIG. 32

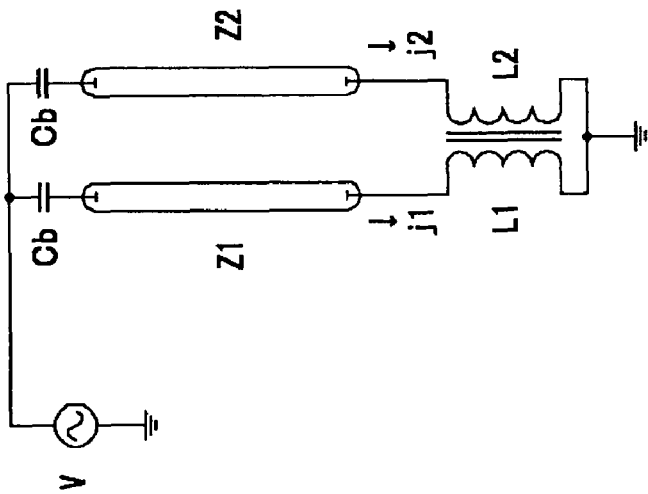

Mutual inductance between $L_1$, $L_2$ is set to $M$

When leakage inductance = 0, $M = L_1$

When $L_1 = L_2$, $L_1 = L_2 = M$ $V = (Z_1 + j\omega L_1) \cdot j_1 - j\omega \cdot M \cdot j_2 \quad \cdots 1$ $V = (Z_2 + j\omega L_2) \cdot j_2 - j\omega \cdot M \cdot j_1 \quad \cdots 2$ From the above equations 1 and 2, $\{Z_1 + j\omega(L_1+M)\} \cdot j_1 - \{Z_2 + j\omega(L_2+M)\} \cdot j_2 = 0$ $j_2 = \dfrac{Z_1 + j\omega(L_1 + M)}{Z_2 + j\omega(L_2 + M)} \cdot j_1 = \dfrac{Z_1 + 2j\omega \cdot L_1}{Z_2 + 2j\omega \cdot L_1} \cdot j_1 \quad \cdots 3$ Even when $Z_1 \neq Z_2$, $j_1 = j_2$ if $2\omega L_2$ is sufficiently larger than $Z_1$, $Z_2$

MODULE FOR PARALLEL LIGHTING AND BALANCER COIL FOR DISCHARGE LAMP

This application is a Divisional of application Ser. No. 11/214,765, filed Aug. 31, 2005 now U.S. Pat. No. 7,479,740 which claims priority to Japanese Patent Application Nos. 2004-254129 filed on Sep. 1, 2004, 2004-348380 filed on Dec. 1, 2004 and 2005-117996 filed on Apr. 15, 2005, all of which are incorporated herein by reference.

TECHNICAL FIELD

The present invention is a dependent invention of the invention of Japanese Patent Application No. 2004-3704 (U.S. Patent Application 2004-155596) filed by the inventors of the present invention, and pertains to a module for parallel lighting and a balancer coil for discharge lamps for a liquid crystal display television and a surface light source.

BACKGROUND OF THE INVENTION

Although balancer coils are generally used for hot-cathode florescent lamps and known, they were initially intended for low-voltage discharge lamps and were not small-sized.

Since the balancer coil is required to be small for cold-cathode florescent lamps and the drive voltage thereof is high, parasitic capacitance should be taken into consideration, which does not require consideration for hot-cathode florescent lamps.

For the use of discharge lamps such as cold-cathode florescent lamps, which require a high voltage and high impedance, it is important to consider not only the parasitic capacitance around the wiring connecting with a cold-cathode florescent lamp, but also the parasitic capacitance between windings of a balancer coil.

A plurality of solutions about a balancer coil has been proposed for the use of cold-cathode florescent lamps. However, each of the solutions contains an extreme instability, and the practical feasibility for the use of cold-cathode florescent lamps is uncertain.

One of the main reasons is the fact that the effects of a balancer coil are unstable. Another is the fact that a balancer coil has not been realized to have a small and thin form to meet the market demands even though the coil has stable effects.

Representative examples regarding balancer coils, as the understanding among those skilled in the art, include Japanese Laid-Open Patent Publication (Kokai) No. Hei 7-45393 (Japanese Patent No. 3291852).

FIG. 4 in the prior art publication corresponding to FIG. 18 discloses that it is important to make the inductance difference between coils N1, N2 in a balancer coil of a cold-cathode florescent lamp smaller. Taking FIG. 4 in the prior art publication as an example, the smaller inductance difference is intended to achieve by winding the two coils alternately.

The structure of the example disclosed in the prior art also aims to make coupling coefficient higher, and those skilled in the art understand that it is important for a balancer coil for cold-cathode florescent lamps to have a high coupling coefficient.

In order to make the coupling coefficient between coils higher, therefore, a balancer coil is ideally a generally rectangular parallelepiped.

For example, FIG. 19 is one example of the prior art of the balancer coil for cold-cathode florescent lamps, which has been considered as the smallest, except the balancer coil disclosed by the inventors of the present invention in the specification of Japanese Patent Application No. 2004-3740 (U.S. Patent application No. 2004-155596).

In the prior art, each coil of a balancer coil has no sections, is layer-wound, and is made into a generally rectangular parallelepiped shape so as to make the coupling coefficient higher.

That is, since the prior art is based on the technical idea that making coupling coefficient higher is important, a flat shape is avoided. The section structure for a coil is similarly avoided since the coupling coefficient decreases thereby.

Also, the balancer coil has to be layer-wound so as not to decrease the coupling coefficient.

The prior art of parallel driving cold-cathode florescent lamps for multiple lamps is disclosed in Japanese Laid-Open Patent Publication (Kokai) No. 2003-31383, in addition to the specification of Japanese Patent Application No. 2004-3740 (U.S. Patent application No. 2004-155596) invented by the present inventors.

FIG. 4 of the specification of Japanese Patent Application No. 2604-3740 (U.S. Patent application No. 2004-155596) corresponding to FIG. 20 discloses multiple balancer coils connected circulatingly. FIG. 6 of the specification of Japanese Patent Application No. 2004-3740 (U.S. Patent application No. 2004-155596) corresponding to FIG. 21 discloses the technique of making magnetic fluxes of three or more coils face one another.

FIG. 6 of Japanese Laid-Open Patent Publication (Kokai) No. 2003-31383 corresponding to FIG. 22 discloses windings W1-Wn wound around the same core, whose numbers of turns are equal.

A balancer coil is easily applicable to a hot-cathode florescent lamp, which is mainly because a hot-cathode florescent lamp can be driven with a low voltage and low impedance. A hot-cathode florescent lamp does not particularly have to be small for its application. From that standpoint, a balancer coil may be large. The inductance of a balancer coil compared to the impedance of a hot-cathode florescent lamp (or the reactance at the operational frequency of an inverter circuit) becomes large enough without any particular consideration, thereby bringing full performance as a balancer.

For the application of a cold-cathode florescent lamp, however, since the drive voltage and impedance of a cold-cathode florescent lamp are high, the reactance required for a balancer is also large. In addition, the influence of the parasitic capacitance produced in each high-voltage part or on windings cannot be ignored.

Since a balancer is mainly used for precision instruments including a backlight for a liquid crystal display television, it is required to be a small or flat shape.

When either of the cold-cathode florescent lamps connected to a balancer coil is not lighted, the core of the balancer coil is saturated, thereby increasing the core loss to elevate temperature. In order to prevent the temperature from rising, the core has to be small as disclosed in the specification of Japanese Patent Application No. 2004-3740 (U.S. Patent application No. 2004-155596).

Those skilled in the art do not necessarily understand correctly the technique of a balancer.

Its typical example, as disclosed in the specification of Japanese Patent Application No. 2004-3740 (U.S. Patent Application No. 2004-155596) invented by the inventors of the present invention, lies in the fact that those skilled in the art make an excessive setting of the reactance required for a balancer to be several times as large as or larger than the integrated impedance of a cold-cathode florescent lamp in the prior art. Regarding this, it is essential that a negative resistance characteristic, which is the differentiated impedance of a cold-cathode florescent lamp, exceed the sum of the reactances of a balancer. It is disclosed that a shunt characteristic is secured by controlling/measuring an impedance characteristic when integrating a cold-cathode florescent lamp into a backlight.

As is seen from Japanese Patent No. 3291852, however, the technical idea persists that coupling coefficient and uniformity in a winding parameter are required as the main parameter showing the effect of a shunt/balance characteristic, and it is the conventional knowledge that there are many restrictions in designing a balancer coil.

A balancer coil, therefore, cannot have a section structure, and has to be a generally rectangular parallelepiped so as to increase coupling coefficient.

It is difficult for the example as disclosed in the publication of Japanese Patent No. 3291852 and many prior arts to have a voltage breakdown structure. It is also difficult for FIG. 23 corresponding to FIG. 4 disclosed in the specification of Japanese Patent Application No. 2004-79571 by the inventors of the present invention to achieve a balancer coil of high voltage breakdown.

Recently, however, the disclosure of the specification of Chinese (TAIWAN) Patent No. 521947 has made clear that it is not coupling coefficient but mutual inductance which is important for a balancer coil.

In a balancer coil for cold-cathode florescent lamps, the impedance and negative resistance of the cold-cathode florescent lamp are considerably larger even compared with those of a hot-cathode florescent lamp, and a very large mutual inductance is required.

Therefore, a balancer coil for cold-cathode florescent lamps has to be wound up by multiple very thin wires. In this respect, the parasitic capacitance generated in a winding lamp (so-called distributed capacitance) cannot be ignored.

It is known, as self-resonance, that resonance takes place between the parasitic capacitance between windings and the self-inductance of windings.

For a balancer coil, when the self-resonance frequency becomes lower than the frequency used in the balancer coil, the balancer coil loses its shunt characteristic and balance characteristic. However, it is difficult to say that such finding has been known among those skilled in the art and no such finding has been disclosed in the prior art.

No such a point has been disclosed in the prior art relating to a balancer coil for cold-cathode florescent lamps. Most of the reasons that a balancer coil for cold-cathode florescent lamps is too unstable for practical use are originated from excessive winding for securing mutual inductance.

Specifically, this is because excessive winding leads to too low self-resonance frequency of the balancer coil, which results in shunt/balance effect has been lost. That is, a balancer coil for cold-cathode florescent lamps has an appropriate range of the number of turns relative to the characteristic of a cold-cathode florescent lamp. Thus, when exceeding the range and when not reaching the range, the shunt/balance effects are lost.

It is known, as the general knowledge, that effective magnetic permeability becomes high when a core is large.

Since a large inductance can be obtained with a small number of turns of winding when a balancer coil is structured by using an adequately large core and coil, the parasitic capacitance between windings becomes smaller, thereby making self-resonance frequency higher. Therefore, even when making an excessive setting for the inductance having a shunt effect, the balancer coil sometimes has the effect with no difficulty. That is, when a balancer coil is structured with a large core, the range in which the balancer coil has shunt/balance effects is wide. Lighting experiments using such a large enough balancer coil have often been conducted.

A balancer coil for the use of cold-cathode florescent lamps is required to be small or flat, which makes the range in which the balancer coil has shunt/balance effects narrower. That is, each of small, flat, slim cores and the like makes effective magnetic permeability lower. As a result, multiple very thin copper wires have to be wound up.

Since a balancer coil for the use of cold-cathode florescent lamps, which is high in voltage and impedance, requires a large inductance, the number of turns of winding becomes larger. At the same time, this is accompanied by the fact that the parasitic capacitance between windings becomes larger, thereby making self-resonance frequency lower.

When self-resonance frequency becomes too low, the balancer coil loses shunt/balance effects. Therefore, a balancer coil especially for the use of cold-cathode florescent lamps should not be wound up excessively, and an excessive setting of inductance suppresses shunt/balance effects contrary to expectation.

In this respect, in order to obtain stable shunt/balance effects in a downsized balancer coil, as disclosed in the specification of Japanese Patent Application No. 2004-3740 (U.S. Patent Application No. 2004-155596), it is essential that an inductance value be set in an appropriate range by controlling the negative resistance characteristic of a cold-cathode florescent lamp.

As described above, the self-resonance frequency of a balancer coil is a factor which suppresses the downsizing of the balancer coil for cold-cathode florescent lamps.

FIG. 19 shows an example of a conventional balancer coil for cold-cathode florescent lamps, which has been smallest. Indicating the characteristics of the balancer, the inductance value of each coil is 200 mH, and self-resonance frequency is about 60 kHz as shown in FIG. 24. Each coil is layer-wound, thereby making self-resonance frequency low.

This is almost the limit value for a balancer coil for cold-cathode florescent lamps. Shunt/balance effects are sometimes shown for the use of a liquid crystal backlight panel, but the balance is sometimes lost suddenly.

Therefore, as disclose in the specification of Chinese (TAIWAN) Patent No. 521947, a ballast capacitor for being inserted into each cold-cathode florescent lamp in series is required so as to secure stability when the balance is lost.

In the example disclosed in FIG. 24, clearly, inductance increases when increasing the number of turns of winding of each balancer coil so as to secure shunt/balance effects, but the self-resonance frequency of the coil becomes further lower on the contrary, thereby losing the shunt/balance effects.

In this case, unless self-resonance frequency can be made higher, the balancer coil cannot be further downsized. Solutions to this problem include the example disclosed in the specification of Japanese Patent Application No. 2004-3740 (U.S. Patent application No. 2004-155596), wherein techniques relating to the downsizing of a balancer coil for cold-cathode florescent lamps are mainly used intensively.

Many approaches to practical application include the example in which balancer coils are laid out on the high-voltage side and on the inverter circuit substrate. This example, however, severely damages the balance effect.

The high-voltage-side wiring from a balancer coil up to a cold-cathode florescent lamp, which is particularly sensitive to the balance of a lamp current, should not be laid out on the inverter circuit side from the cold-cathode florescent lamp through the long wiring. Unless the high-voltage-side wiring is laid out adjacent to the cold-cathode florescent lamp as an independent shunt circuit module on the substrate, the effect thereof cannot be exhibited.

For the application of a backlight for a liquid crystal display television, multiple cold-cathode florescent lamps have to be lighted as a proposition. The inventors of the present invention then disclosed the connection method in FIG. 4 of the specification of Japanese Patent Application No. 2004-3740 (U.S. Patent application No. 2004-155596). In this connection method, however, a circulating current flows thereby decreasing the performance unless the leakage inductance of a balancer coil is made large. In this respect, the leakage inductance has to be larger.

In FIG. 6 of the specification of Japanese Patent Application No. 2004-3740 (U.S. Patent application No. 2004-155596) corresponding to FIG. 21, the technique is disclosed that magnetic fluxes of three coils or more are made to face one another so as to achieve the balance. Although this method has sufficient shunt/balance effects with three or four lamps, lamps of a number exceeding four decrease each coupling coefficient between windings as the number of lamps increases, thereby decreasing mutual inductance effective for shunting/balancing so that shunt/balance effects are gradually lost.

FIG. 6 of Japanese Laid-Open Patent Publication (Kokai) No. 2003-31383 (U.S. Pat. No. 6,717,372B2) discloses that balance/shunt effects can be obtained by windings W1 to Wn wound up around a single core.

This is visually shown as the structure in FIG. 25, which is difficult to achieve practically. There is no balance effect in spite of trying to balance a large number of lamps. Actually, shunt effects are maintained only by the self-inductance of each coil.

Patent document 1: Japanese Laid-Open Patent Publication (Kokai) No. Hei 7-45393

Patent document 2: Japanese Laid-Open Patent Publication (Kokai) No. 2003-31383 (U.S. Pat. No. 6,717,372B2)

Patent document 3: Japanese Patent Application No. 2004-3740 (US Patent Application Publication No. 2004-155596)

Patent document 4: Japanese Patent Application No. 2004-79571 (U.S. patent application Ser. No. 11/081,545)

Patent document 5: Japanese Patent No. 3291852

Patent document 6: Chinese (TAIWAN) Patent No. 521947 Specification

SUMMARY OF THE INVENTION

The present invention aims at providing a small balancer coil having sufficient shunt/balance effects for the use of cold-cathode florescent lamps.

In this respect, it is desirable to obtain sufficient shunt/balance effects also in a small and flat balancer coil by applying section winding to each coil so as to make self-resonance frequency higher, thereby enabling multiple numbers of turns of winding.

In order for a balancer coil for cold-cathode florescent lamps to have shunt/balance effects, it is not coupling coefficient but mutual inductance which is important. Therefore, it is only necessary to secure the required mutual inductance.

The self-resonance frequency of each coil becomes a barrier against the downsizing of a balancer coil for cold-cathode florescent lamps. Therefore, the self-resonance frequency of each coil has to be higher.

The delay of the distributed constant cannot be ignored near the self-resonance frequency of a high frequency coil. For example, since the winding method of a conventionally available common mode choke coil or the like is generally applied for a balancer coil, the wiring thereof is as shown in FIG. 27 for convenience of production thoroughly. However, the wiring does not consider the delay of the distributed constant appearing near the self-resonance frequency of a coil.

In this respect, pins No. 1 to No. 4 are short-circuited when structuring a balancer coil, and the part of the coil which is firstly influenced by progressive wave is the part adjacent to the next coil seen from each coil. Explaining this referring to FIG. 28, the pin firstly acted on by a progressive wave A is the pin No. 1 to which the end of winding is fixed while the pin firstly acted on by a progressive wave B is the pin No. 4 to which the beginning of winding is fixed. In such a connection method, therefore, each coil has a progressive wave of a different direction, and even when trying to cancel the magnetic fluxes generated between the coils of a balancer coil, the magnetic flux component which cannot be completely canceled remains. This suppresses the shunt/balance effects of a balancer coil near self-resonance frequency.

In order to achieve the above objects, the present invention has been achieved to realize a balancer coil for discharge lamps having two coils whose magnetic fluxes face each other, wherein the magnetic fluxes generated by the coils are canceled by facing, lamp currents of the discharge lamps are balanced by making the sum of reactances of the mutual inductance of the balancer coil larger than the negative resistance of the discharge lamp, and balance effect can be maintained even in a small/flat balancer coil by applying section winding to each coil of the balancer coil so as to make self-resonance frequency of each coil higher.

It is another object of the present invention, in a shunt circuit module having a balance effect of lamp currents of multiple discharge lamps comprising multiple balancer coils for canceling the pair of magnetic fluxes, wherein the balancer coil has two coils whose magnetic fluxes face each other; one end of either coil of the balancer coil is connected to the other coil of the balancer coil and connected to one end of the electrode of the discharge lamp through the coil so as to mutually connect the multiple the balancer coils circulatingly by repeating this; and one ends of the balancer coil which are not connected to the discharge lamp are integrally connected, the balancer coil suppresses the circulating current flowing between the shunt coils by decreasing coupling coefficient so as to increase leakage inductance; and a magnetic circuit is structured so that the magnetic fluxes generated in the cores of the multiple shunt coils face and cancel each other in all core connection parts.

It is still another object of the present invention, in the shunt circuit module, to achieve a shunt circuit module wherein the influence of parasitic capacitance is decreased by considering the parasitic capacitance generated in the connecting line connecting respective shunt coils.

It is still another object of the present invention, in the shunt circuit module, to achieve a shunt circuit module wherein the influence of parasitic capacitance is decreased by alternately connecting the connecting line connecting the respective shunt coils so as to make the lengths of the connecting lines connecting the shunt coils almost equal.

Furthermore, it is another object of the present invention to improve the shunt/balance effects of a balancer coil near self-resonance frequency by considering the delay of the distributed constant generated in each winding.

Additionally, it is another object of the present invention to improve the shunt/balance effects of a balancer coil by providing a short-circuit winding wound up adjacent to each winding so as to mutually connect the short-circuit windings.

BRIEF DESCRIPTION OF THE DRAWINGS

FIG. 1 shows an embodiment in which a self-resonance frequency of each coil becomes higher by applying section winding to each coil of a balancer coil of one embodiment of the present invention;

FIG. 32 is a comprehensive equivalent circuit diagram for explaining the shunt/balance operation of the balancer coil according to the present invention.

DESCRIPTION OF THE PREFERRED EMBODIMENTS

Figure 21:
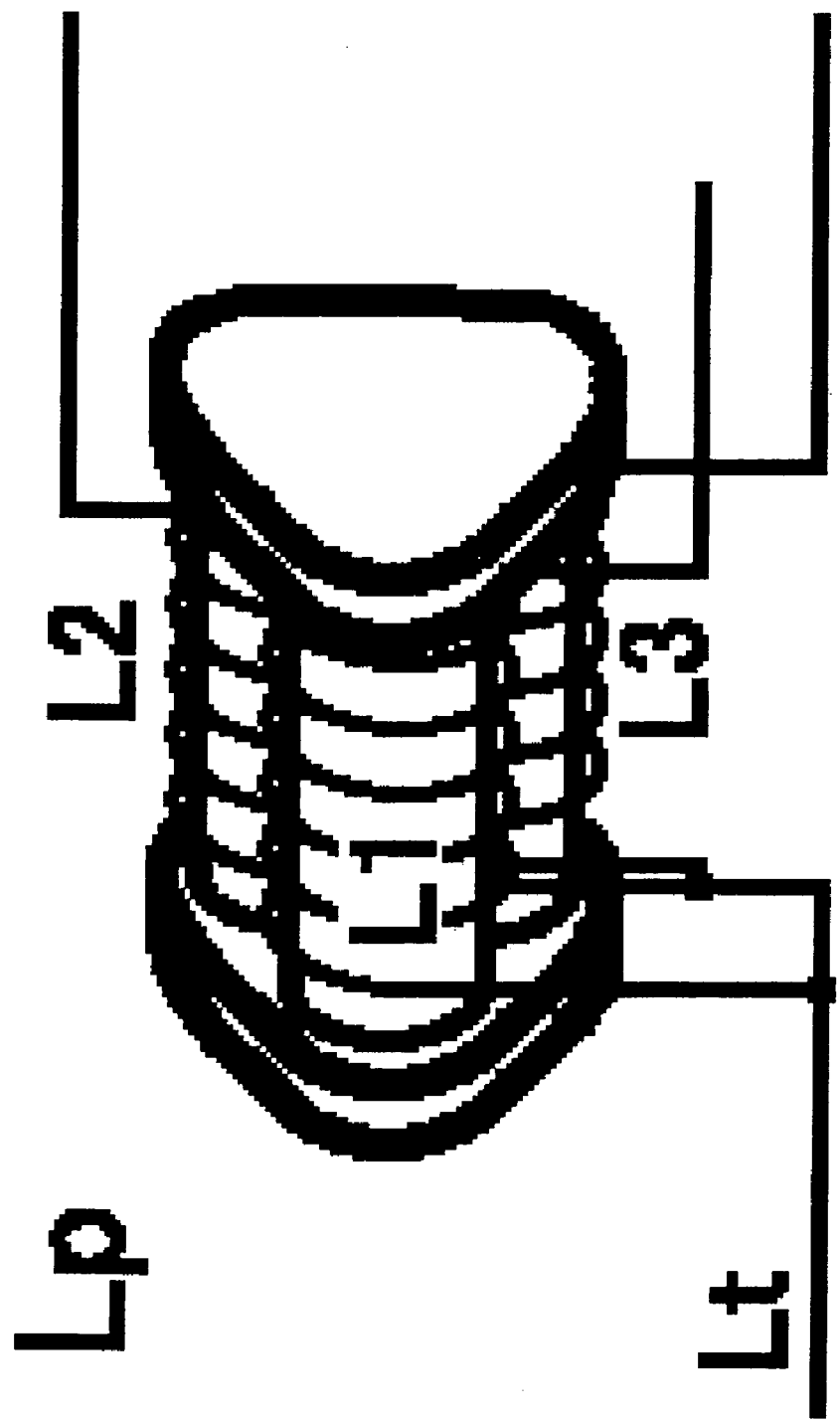
FIG. 21 is a structural perspective view showing one example of a technique in which magnetic fluxes of three or more conventional coils face one another.

FIG. 1 shows an embodiment of the present invention, wherein a balancer coil for cold-cathode florescent lamps is designed to make self-resonance frequency of each coil higher by applying section winding to each coil of the balancer coil, as an alternative method for achieving FIG. 21 in the specification of Japanese Patent Application No. 2004-3740 (U.S. Patent Application No. 2004-155596).

In one embodiment shown in FIG. 1, each coil of the balancer coil has three sections. As a result, when mutual inductance is 600 mH, self-resonance frequency can be 120 kHz. In this case, coupling coefficient does not particularly have to be high, and it is only necessary to secure a required mutual inductance. The balancer coil of this embodiment, therefore, is not limited to a generally rectangular parallelepiped as in the prior art, and can be flat or slim.

Section structure increases the breakdown voltage of the balancer coil in this embodiment, and this embodiment is applicable to the high voltage breakdown balancer coil required for the invention disclosed in the specification of Japanese Patent Application No. 2004-79571.

Based on the perspective that mutual inductance is important and that self-resonance frequency has to be high, as shown in the publication of Japanese Patent No. 3291852, the structure is not required in which windings are densely close to each other so as to have the same conditions between coils of the balancer coil equal.

Figure 4:
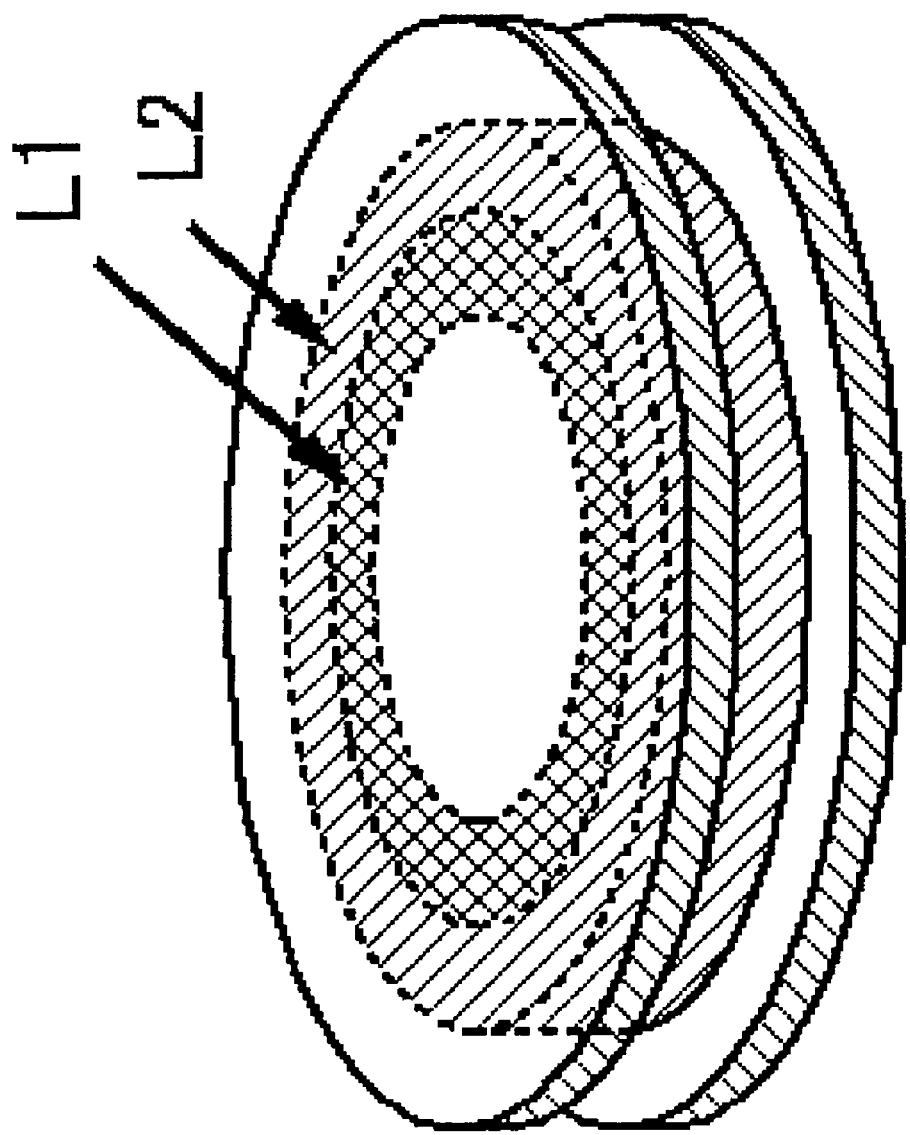
FIG. 4 is a conceptual diagram showing one exemplary preferred structure of a coil used in the present invention.

In order to maintain the mutual inductance of the coil large and to make self-resonance frequency higher, the core structure of a drum shape shown in FIG. 4 is also effective. In this case, first windings L1 are concentrically applied from the center, and second windings L2 on the outer side thereof. The core structure may be PQ type in this case.

Although the conditions of the two windings are not apparently equal in such a structure, since the coupling coefficients relative to the windings on the other side are the same from the windings of either side as the general property of a transformer, mutual inductances become equal as long as the self-inductances of the first windings and the second windings an equal, thereby bringing uniform balance/shunt effects.

Figure 5:
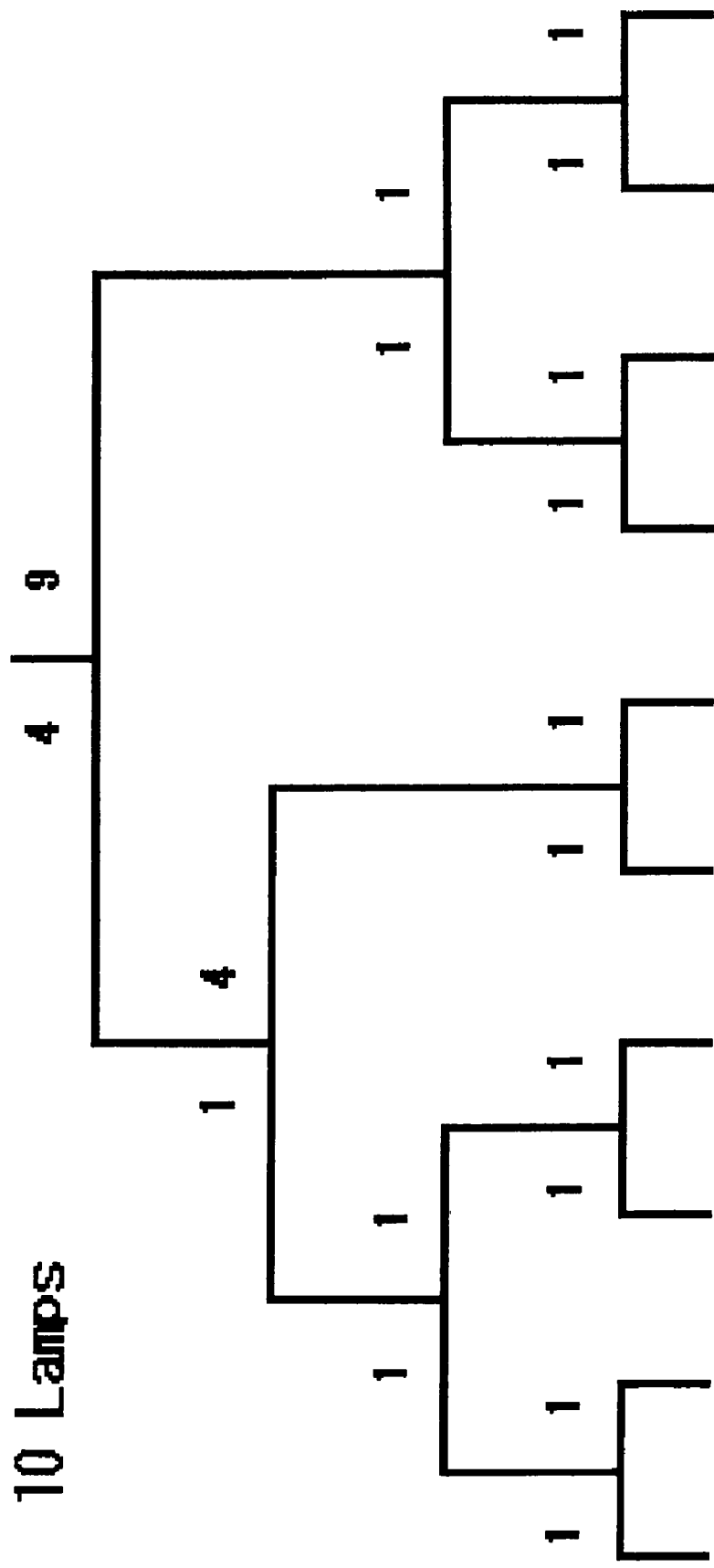
FIG. 5 is a structural diagram showing one example of a uniform shunt circuit module according to the present invention.
Figure 6:
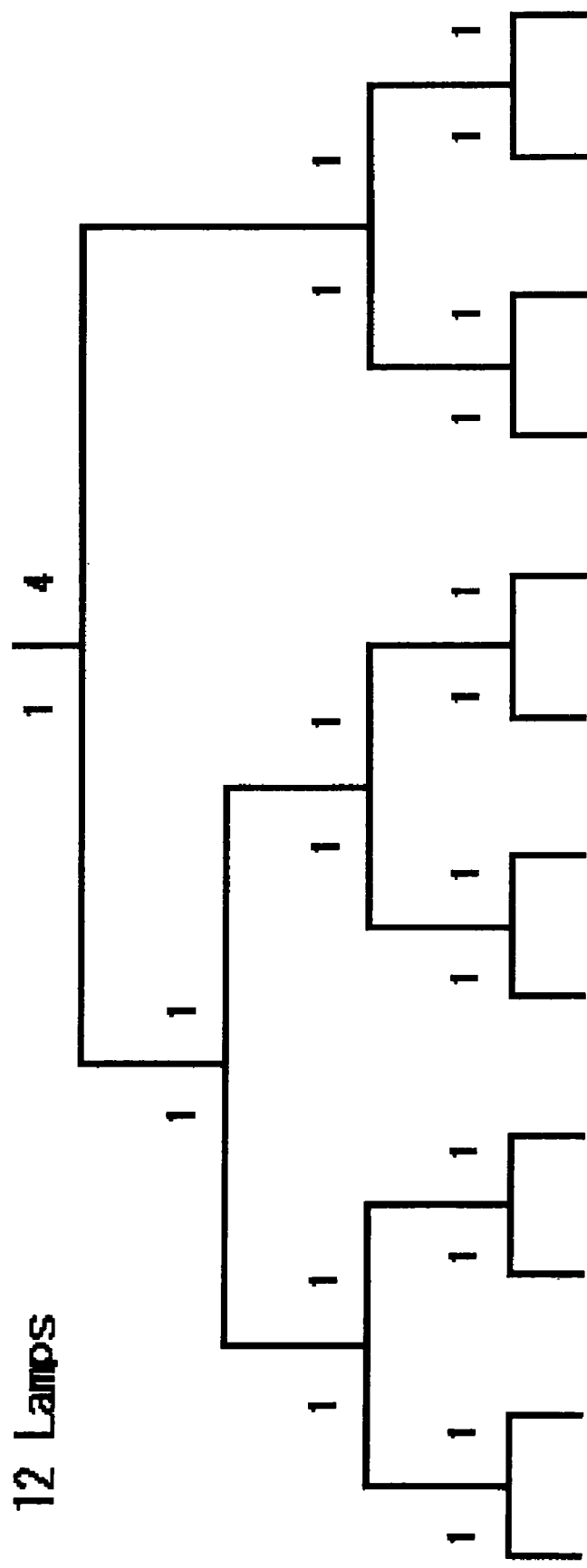
FIG. 6 is a structural diagram showing another example of the uniform shunt circuit module according to the present invention.
Figure 7:
FIG. 7 is a structural diagram showing a different example of the uniform shunt circuit module according to the present invention.

When changing inductance ratio, the balancer coil can obtain the shunt effect of the current in proportion to the square root of the inductance ratio. An arbitrary shunt circuit module for multiple lamps can be structured by utilizing this property. FIG. 5 to FIG. 7 are examples of uniform shunt circuit modules with 10 lamps, 12 lamps and 14 lamps structured in a tournament tree shape based on the specification of Japanese Patent Application No. 2004-3740 (U.S. Patent application No. 2004-155596). The written values denote inductance value ratio.

While the specification of Japanese Patent Application No. 2004-3740 (U.S. Patent application No. 2004-155596) discloses a tournament tree which simply means the connection on the circuit diagram, the lengths of the wirings structuring a tournament tree have to be as short as and as equal as possible. For example, even though the connections on the circuit diagram are similarly illustrated, FIG. 8 and FIG. 9 have different effects.

Such a phenomenon, which is particular to a balancer coil for cold-cathode florescent lamps, does not have to be considered in a balancer coil for hot-cathode florescent lamps. Therefore, a shunt circuit module is ideally structured so as to be independent of an inverter circuit, and is laid out adjacent to the electrode of a cold-cathode florescent lamp most effectively.

Figure 8:
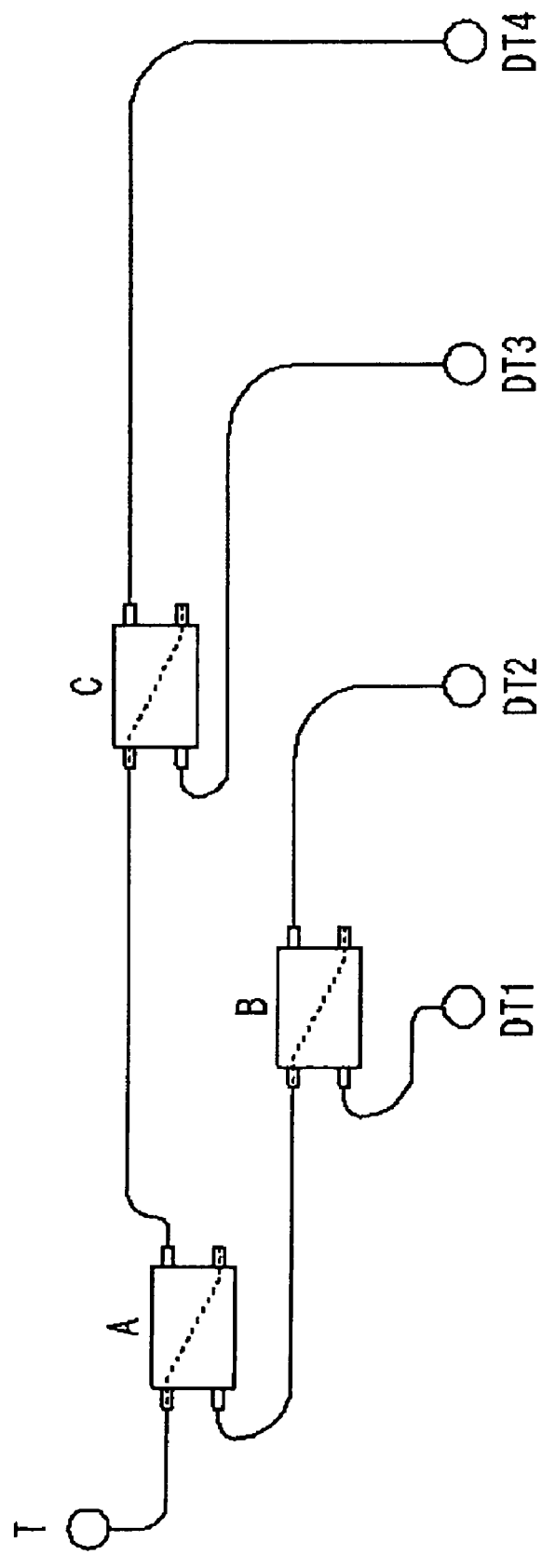
FIG. 8 is a circuit diagram showing one example of unfavorable connection in the present invention.

Referring now to FIG. 8, reference mark T denotes an input side of the shunt circuit module and A, B, C shunt coils. The outputs of the shunt circuit modules are connected to discharge lamps DT1 to DT4. Such a physical layout as in FIG. 8 does not obtain a favorable shunt/balance effects, which is because the lengths of the wires connected to the discharge lamps DT1 to DT4 are not equal. The wires connected to DT3 and DT4, arranged in parallel to each other so as to be electrostatically coupled also suppress the shunt/balance effects.

Figure 9:
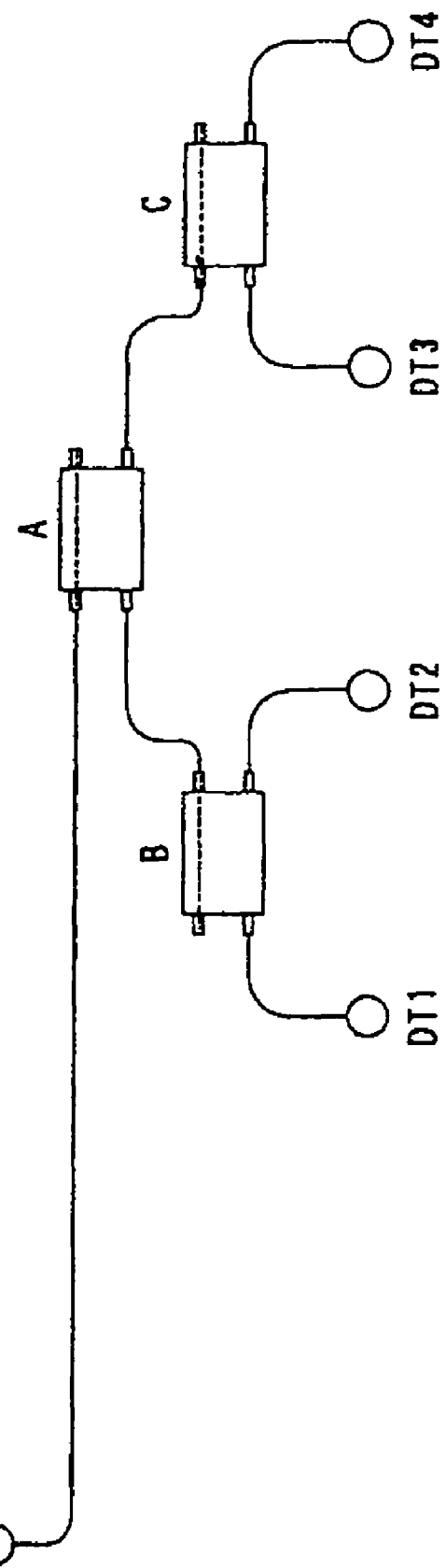
FIG. 9 is a circuit diagram showing one example of favorable connection in the present invention.

As apparent from the above, the shunt circuit module is effectively laid out so that the lengths of the wirings are almost equal so as to make these influences as small as possible. Specifically, the shunt circuit module requires; a structure in a tournament tree shape also in a physical layout as shown in FIG. 9.

The present invention, therefore, is differentiated from the tournament tree in the specification of Japanese Patent Application No. 2004-3740 (U.S. Patent Application No. 2004-155596) by laying out the shunt circuit modules in a tournament tree shape also in the physical position, meaning that a tournament tree shape is applied not only on the circuit diagram but also on the physical layout.

Figure 10:
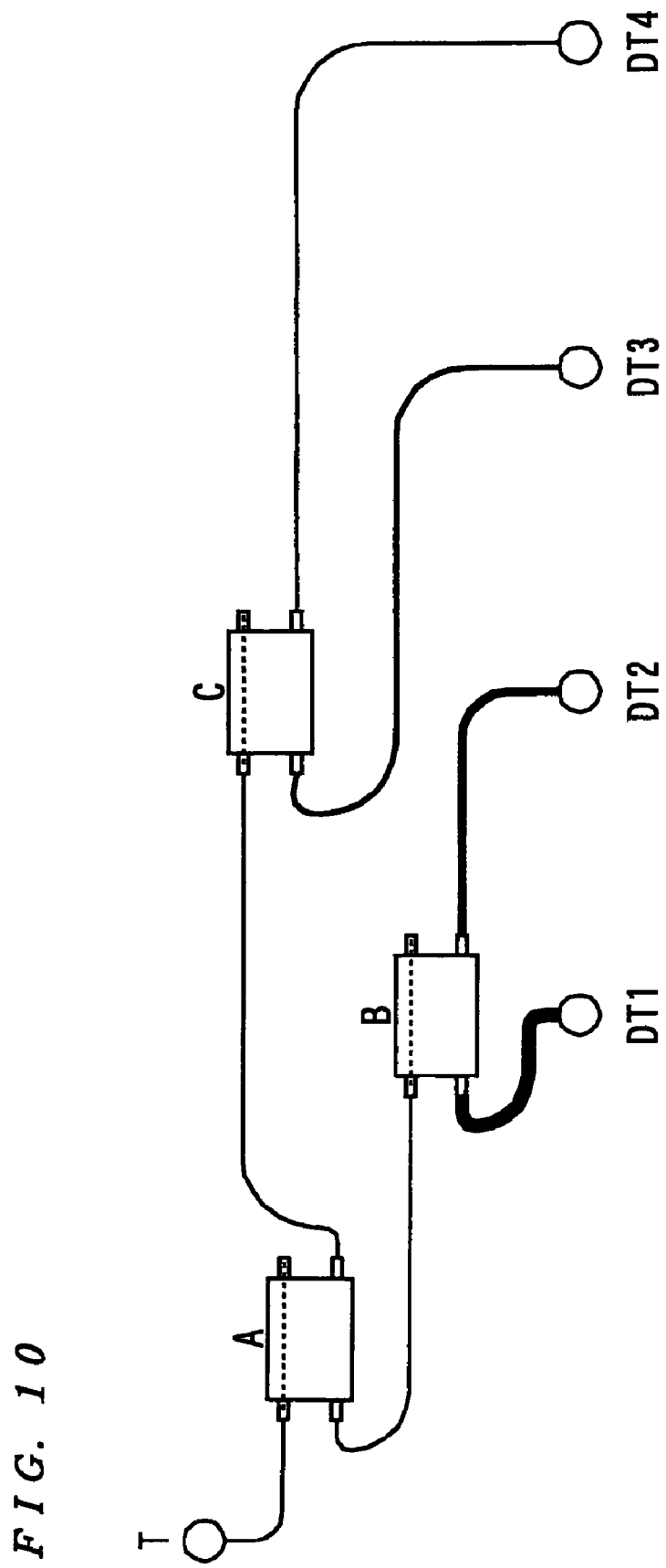
FIG. 10 is a circuit diagram showing another example of favorable connection in the present invention.

As apparent from the above, uniformity is required also in the physical layout, which is caused by the parasitic capacitance generated on the wirings. Therefore, if the lengths of the wirings are necessarily different, it is also effective, as shown in FIG. 10, to make short wiring thick and the longer wiring gradually the thinner so as to make the parasitic capacitance equal.

Figure 29:
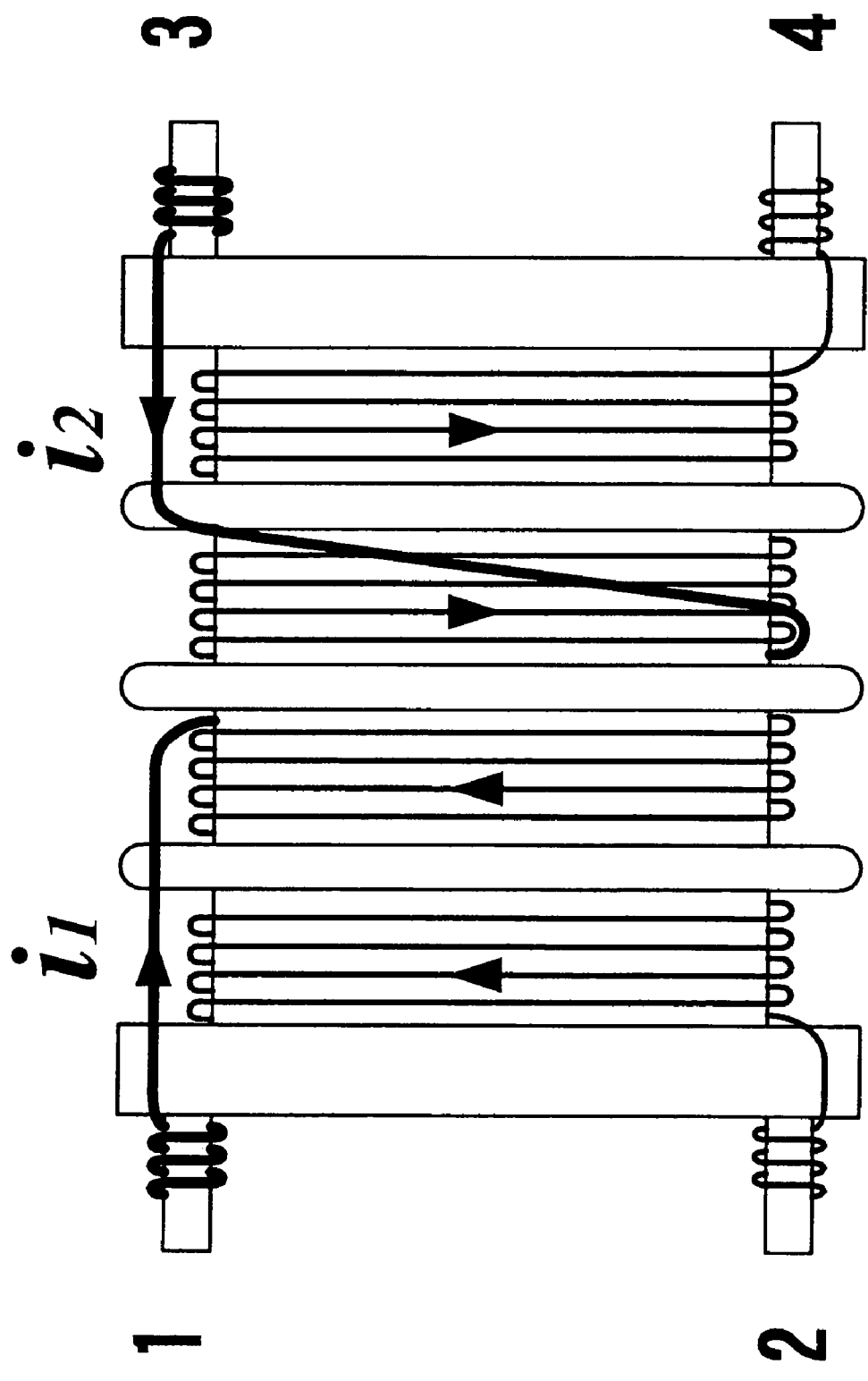
FIG. 29 is a structural diagram showing one example of wiring of a balancer coil considering the influence of the progressive wave generated on windings.

The balancer coil has to be structured as shown in FIG. 29, considering not only the fact that the magnetic field generated by the current flowing in each winding of the balancer coil is canceled, but also the influence of the progressive wave generated on the windings.

Specifically, in order to cancel magnetic fluxes completely including phase lag caused by delay, by reversing the directions of the progressive waves generated on the windings, as shown in FIG. 29, the beginning of each winding has to start from the outer side of the balancer coil being wound up toward the center, or through the reverse process, and furthermore, the winding directions of the windings have to be reversed.

Figure 30:
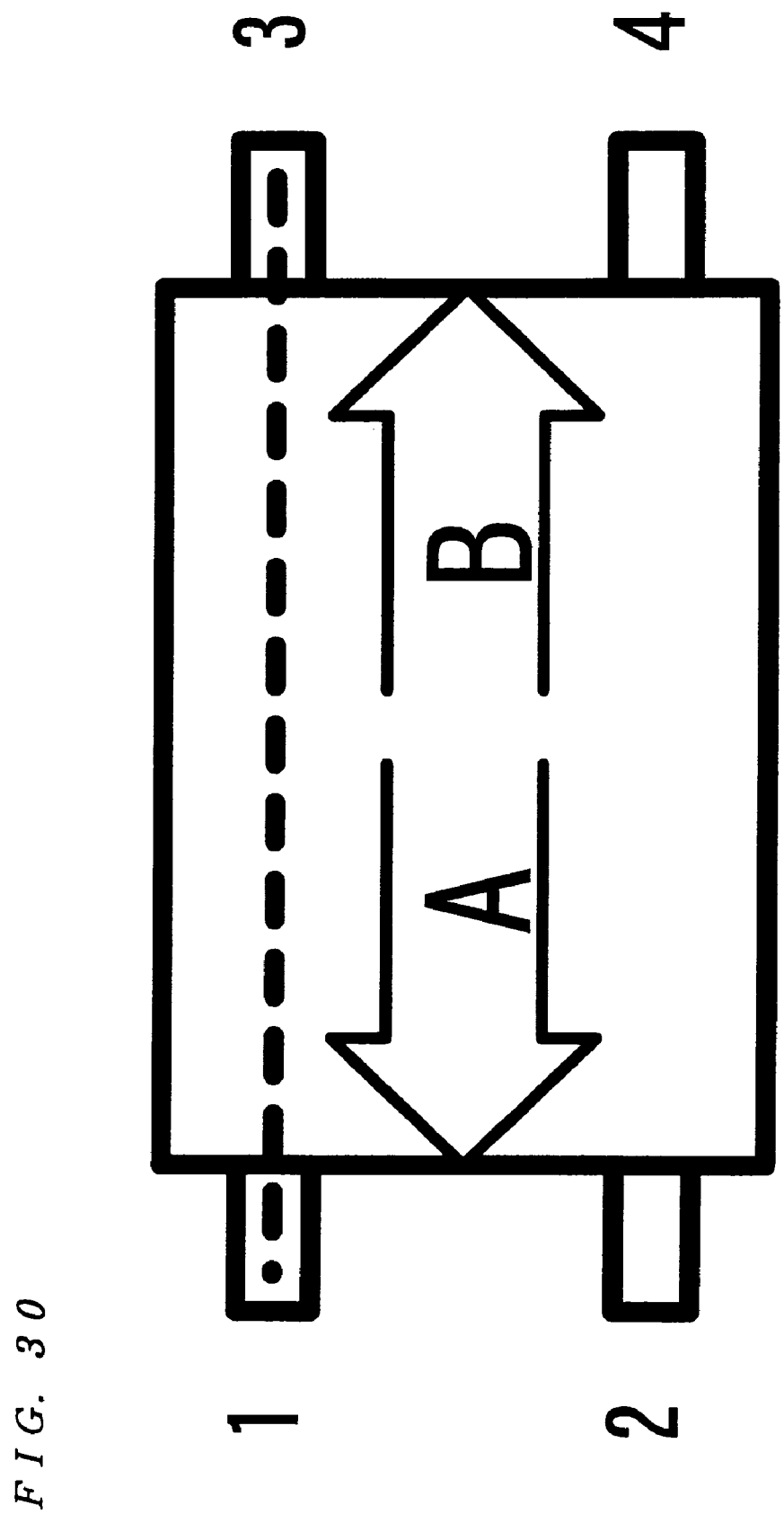
FIG. 30 is an explanatory diagram showing the windings acted on by progressive waves A, B generated on the secondary windings of each coil by the progressive wave obtained when short-circuiting pins 1 to 3 of the balancer coil shown in FIG. 29.

In this embodiment, therefore, when short-circuiting pins 1-3 as shown in FIG. 30, the pin firstly acted on by a progressive wave A is the pin No. 1 to which the end of winding is fixed. The pin firstly acted on by a progressive wave B is the pin No. 4 to which the end of winding is fixed. In such a connection method, therefore, each coil has a progressive wave of the same direction; the direction of a current is indicated by the arrow; the generated magnetic fluxes face each other; and the generated progressive waves are canceled symmetrically contrary to each other as shown in FIG. 30.

The arrows A, B in FIG. 30 indicates the direction of the progressive wave generated on secondary windings, not the direction of magnetic flux. It is also needless to say that magnetic fluxes should be cancelled by being faced each other in the balancer coil. Such a winding method is generally unpopular due to the producing constraint that windings easily are off from the winding frame during production process. This is the point to be considered.

Figure 28:
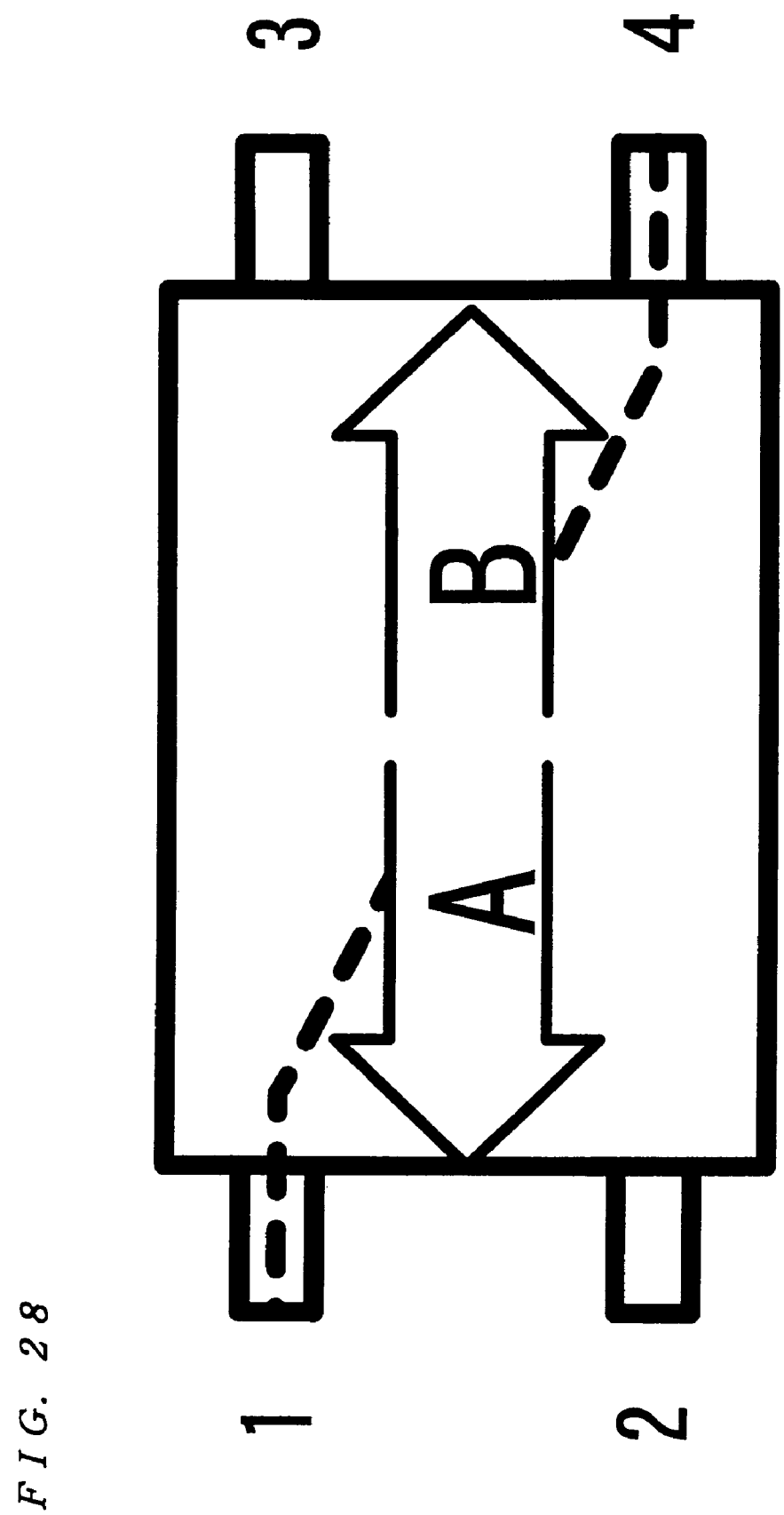
FIG. 28 is an explanatory diagram showing directions A, B of progressive waves generated on the secondary windings of each coil and windings acted on by the progressive waves when short-circuiting pins 1 to 4 of the balancer coil shown in FIG. 27.

In the prior art, cross wiring is generally employed as shown in FIG. 28.

The specification of Japanese Patent Application No. 2004-3740 (U.S. Patent Application No. 2004-155596) discloses that the number of turns of winding gradually decreases toward the windings value in the upper layer of a tournament tree. Furthermore, in the present invention, either negative resistance on the side which has the larger value of negative resistance of this value and the impedance of the cold-cathode florescent lamp connected in parallel, synthesized in parallel, is exceeded by the sum of the mutual inductances of the balancer coil for shunt. As a result, the minimum conditions required for shunt is clarified, thereby selecting a necessary, minimum and suitable inductance.

Figure 20:
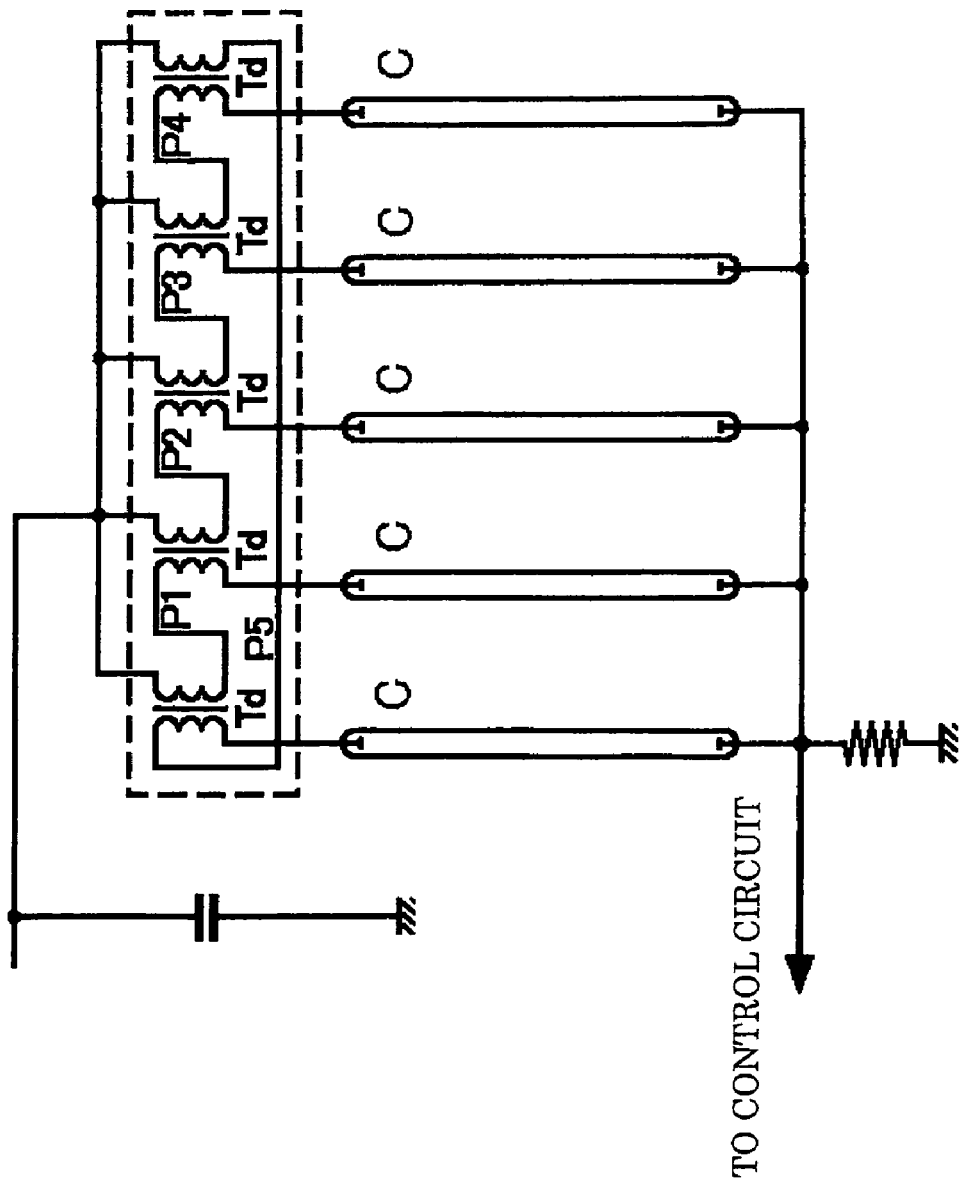
FIG. 20 is a structural diagram showing one example in which multiple conventional balancer coils are circulatingly connected.

As another method for structuring the shunt circuit module for multiple lamps, FIG. 4 of the specification of Japanese Patent Application No. 2004-3740 (U.S. Patent application No. 2004-155596) (corresponding to FIG. 20 in this specification) is disclosed, wherein the coupling coefficient of the balancer coil has to be smaller thereby increasing the value of leakage inductance in order to achieve the shunt circuit module. This is advantageous for the section winding in the present invention on the contrary, which decreases coupling coefficient.

Figure 2:
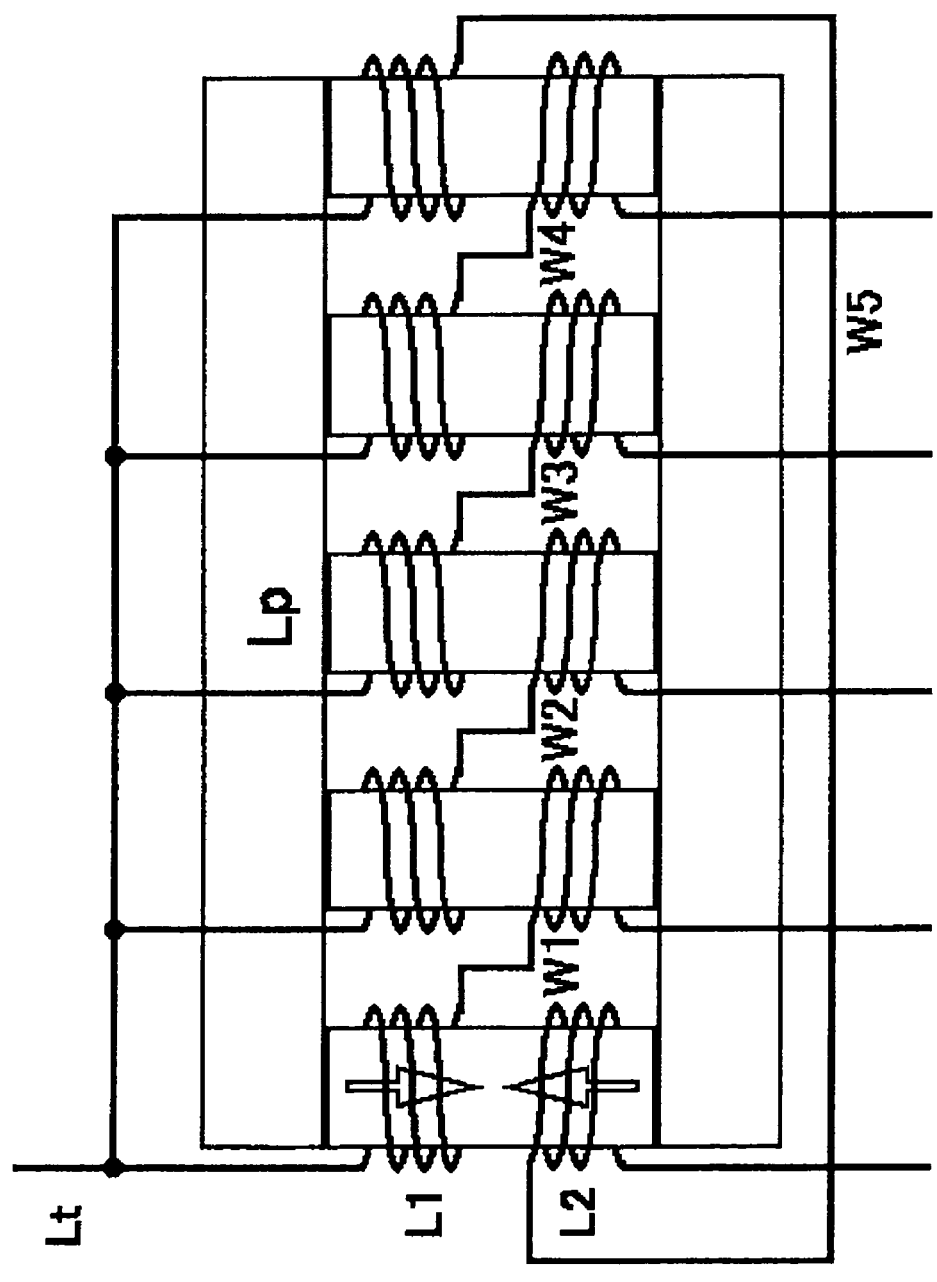
FIG. 2 shows another embodiment of the present invention.

FIG. 6 of the specification of Japanese Patent Application No. 2004-3740 (U.S. Patent application No. 2004-155596) (corresponding to FIG. 21 in this specification) discloses the example in which coupling coefficient becomes too low for multiple lamps. FIG. 2 shows one embodiment which utilizes this property on the contrary and combines with the example disclosed in FIG. 4.

The example disclosed in FIG. 2 prevents coupling coefficient from decreasing when multiple coils are connected, by taking coils adjacently facing each other as a set so as to mutually connect the set of coils circulatingly.

Figure 22:
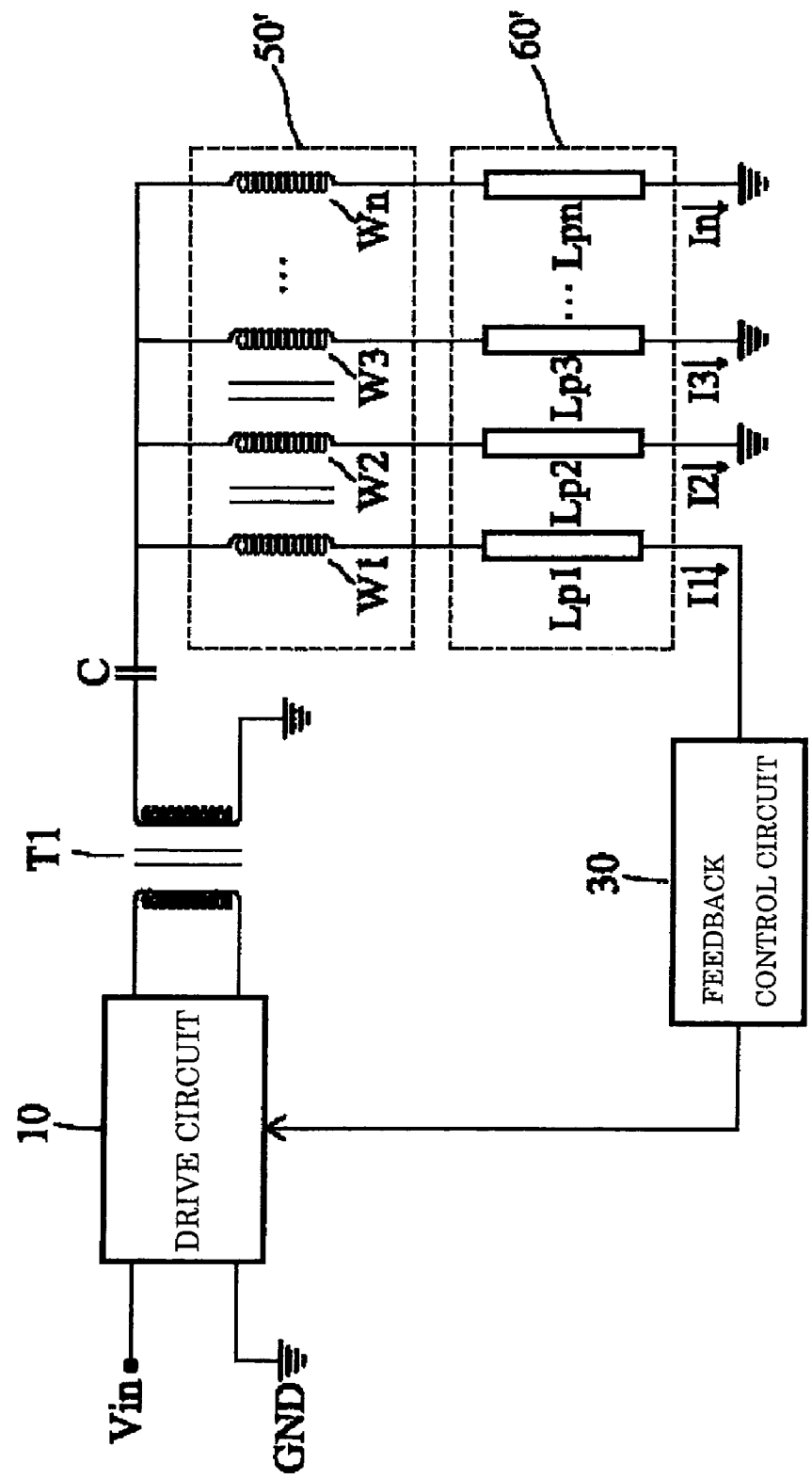
FIG. 22 is a circuit structural diagram showing one example in which conventional windings W1-Wn are wound up around a single core and their numbers of turns are equal.
Figure 23:
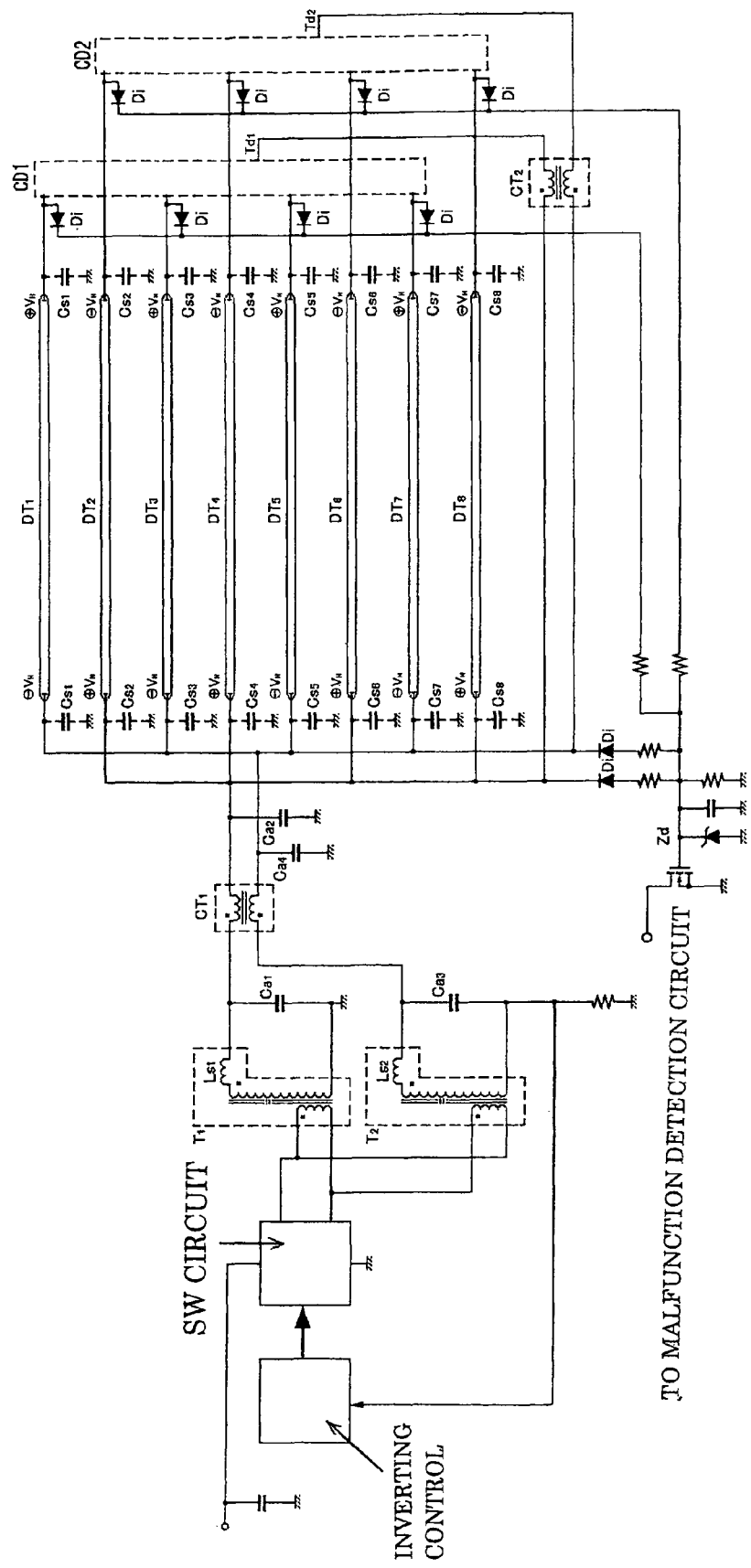
FIG. 23 is a circuit structural diagram showing one example in which it is considered as difficult to achieve a conventional high voltage breakdown balancer coil.
Figure 33:
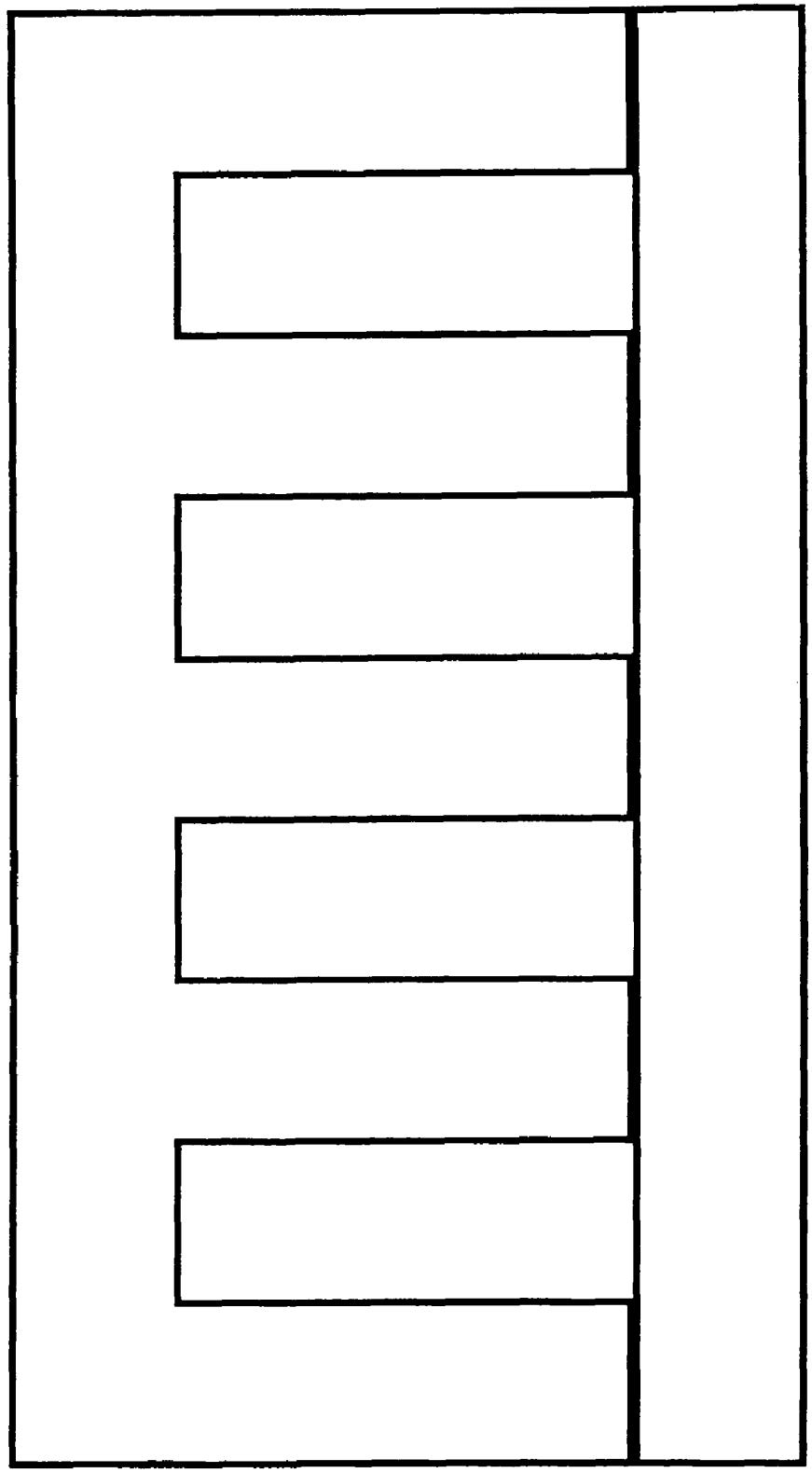
FIG. 33 and FIG. 34 are disclosed examples showing a core shape of the balancer coil according to the present invention.
Figure 34:
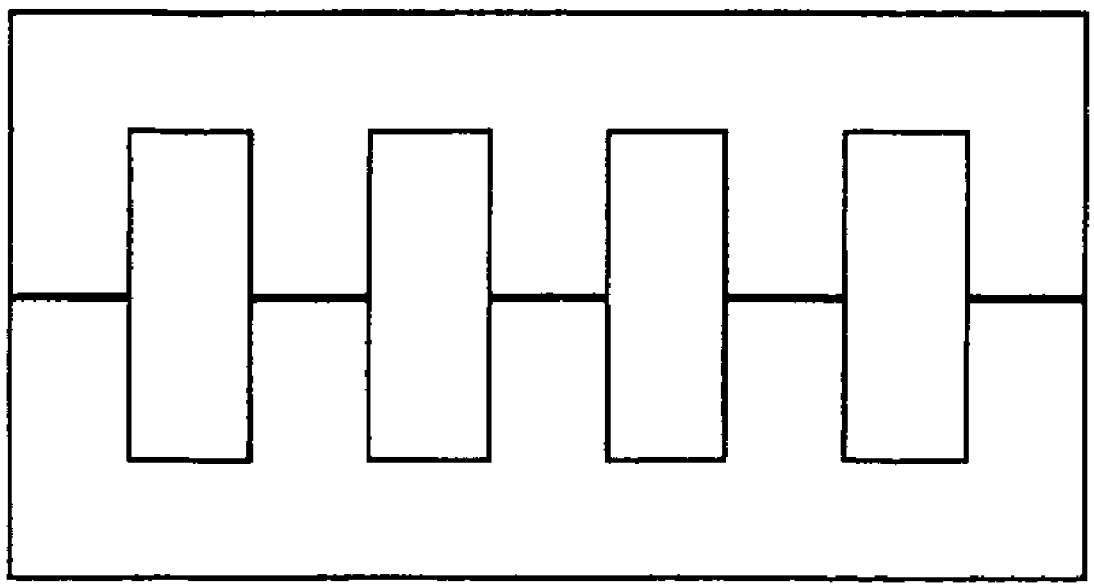
Figure 35:
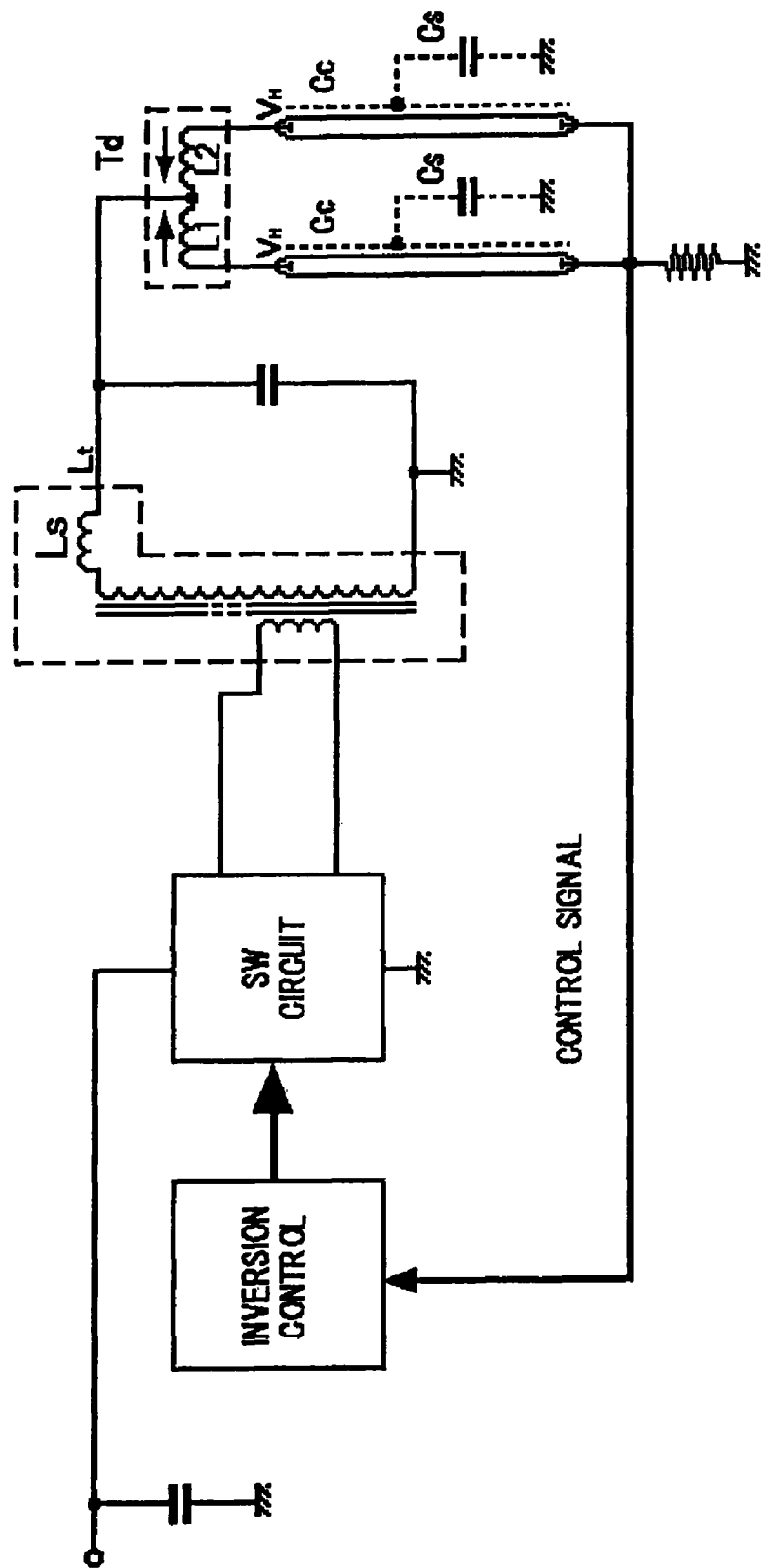
FIG. 35 illustrates an example of a conductor (Cc) located close to a discharge lamp, where Cs is a parasitic capacitance between the conductor and the discharge lamp.

In FIG. 6 of the example disclosed in Japanese Laid-Open Patent Publication (Kokai) No. 2003-31383 (corresponding to FIG. 22 in this specification), these relevant coils are wound up around a single core. In order to obtain actually effective shunt/balance effects, however, it is essential that the coils wound up around independent cores, not adjacently wound up around the single core, are integrated as shown in FIG. 2 so as to make the magnetic fluxes generated from the coils face each other (as illustrated by the arrows facing each other in FIG. 2). It is difficult to achieve such a structure if coils are wound up around a single core. In the present invention, the expression "independent core" means multi-leg structure, which also includes equivalently a core integrally formed for convenience of production. Therefore, since the technical subject matters should be defined by magnetic properties persistently, the core of multi-leg structure has been disclosed preliminarily (see FIG. 33, FIG. 34).

The structure shown in FIG. 2 prevents coupling coefficient from decreasing when multiple coils are connected, by taking coils adjacently facing each other as a set so as to mutually connect the set of coils circulatingly. In this case, the core of this structure does not necessarily have to be divided for each coil facing each other, and the entire core may be divided into two or more. In this connection method, when each coil is laid out on the circumference, the wiring between coils can be uniform. When arranging the coils in a line in a plane, the mutual distance is not necessarily equal. For example, W5, which is one of the wirings circulating connected and is particularly long, is strongly influenced by parasitic capacitance, so that the current balance is lost.

Figure 3:
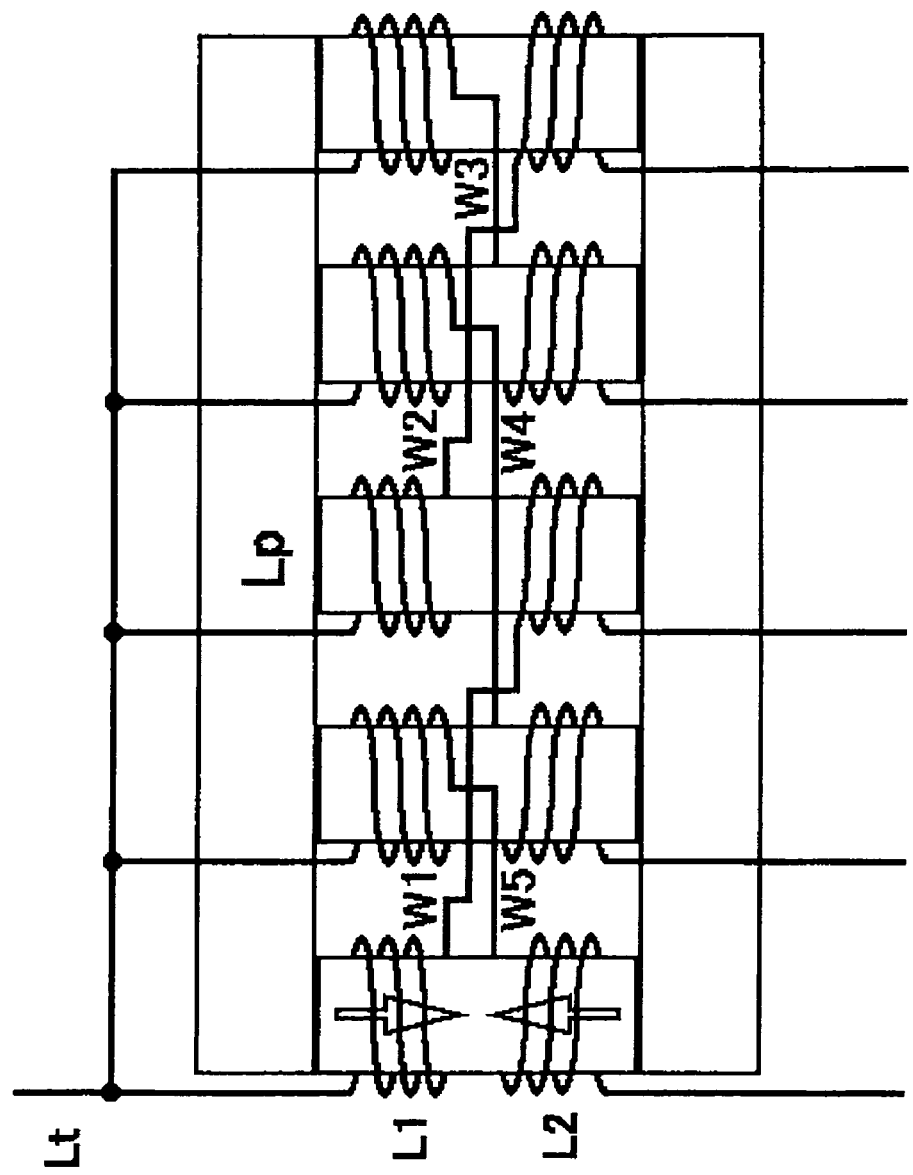
FIG. 3 shows a different embodiment of the present invention.

Thus, the example shown in FIG. 3 establishes a connection alternatively avoiding the wiring between the coils facing each other, and establishes a connection alternatively avoiding the rest of the wirings between the coils for return again, so as to make the length of each wiring almost equal. This connection method improves current balance. It should be noted that the arrows facing each other in FIG. 3 illustrates magnetic fluxes facing each other.

Figure 11:
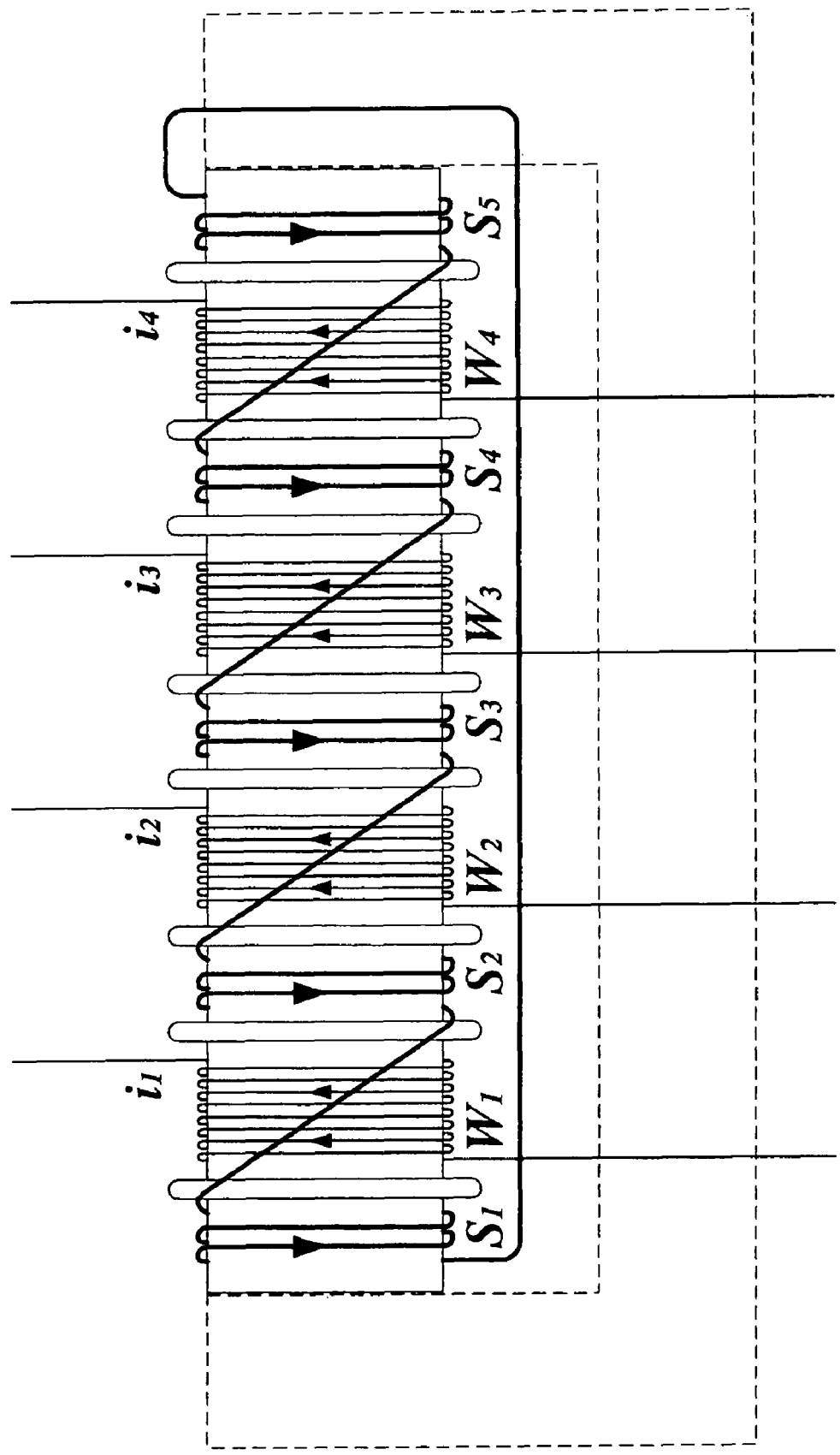
FIG. 11 is a structural diagram of one example showing a shunt circuit module for achieving shunt/balance effects according to the present invention.

FIG. 6 of the publication of Japanese Laid-Open Patent Publication (Kokai) No. 2003-31383, which is described above, corresponding to FIG. 22, is actually impractical. FIG. 11 shows the method for achieving actual shunt/balance effects by further improving the example. Each of one ends of windings W1 to W4 is connected to a cold-cathode florescent lamp, and each of the other ends is bound up and integrally connected. Reference mark S1 to S5, which denote short-circuit windings, are wound up by mutually being connected so that the magnetic flux facing the magnetic flux generated in each coil of the windings W1 to W4. By such a connection, the shunt circuit module shown in FIG. 11 exhibits shunt/balance effects.

Figure 12:
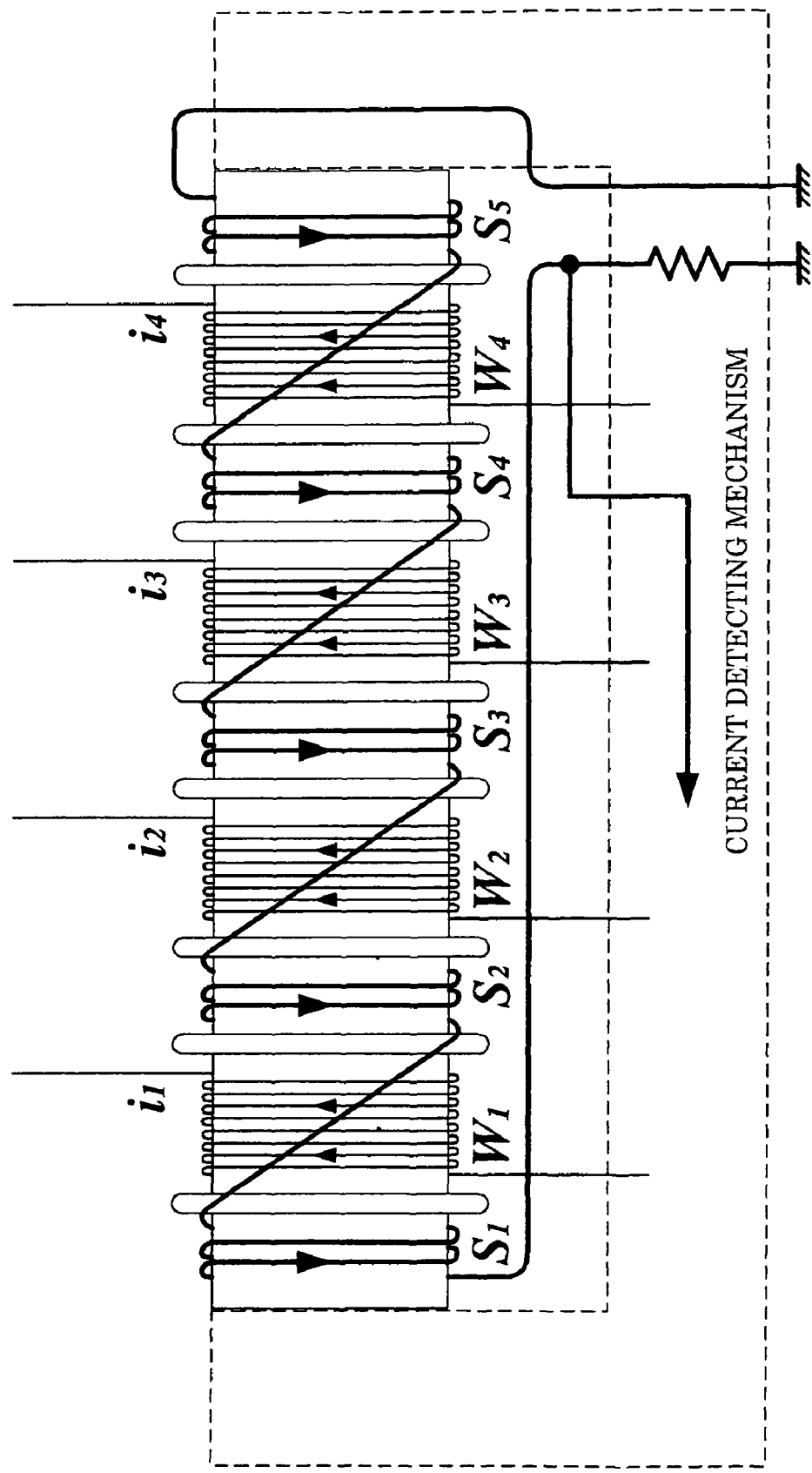
FIG. 12 is a structural diagram of another example showing the shunt circuit module for achieving shunt/balance effects according to the present invention.

As shown in FIG. 12, a current detecting mechanism can be provided by cutting up any of the connecting lines of short-circuit windings S1 to S5.

Figure 15:
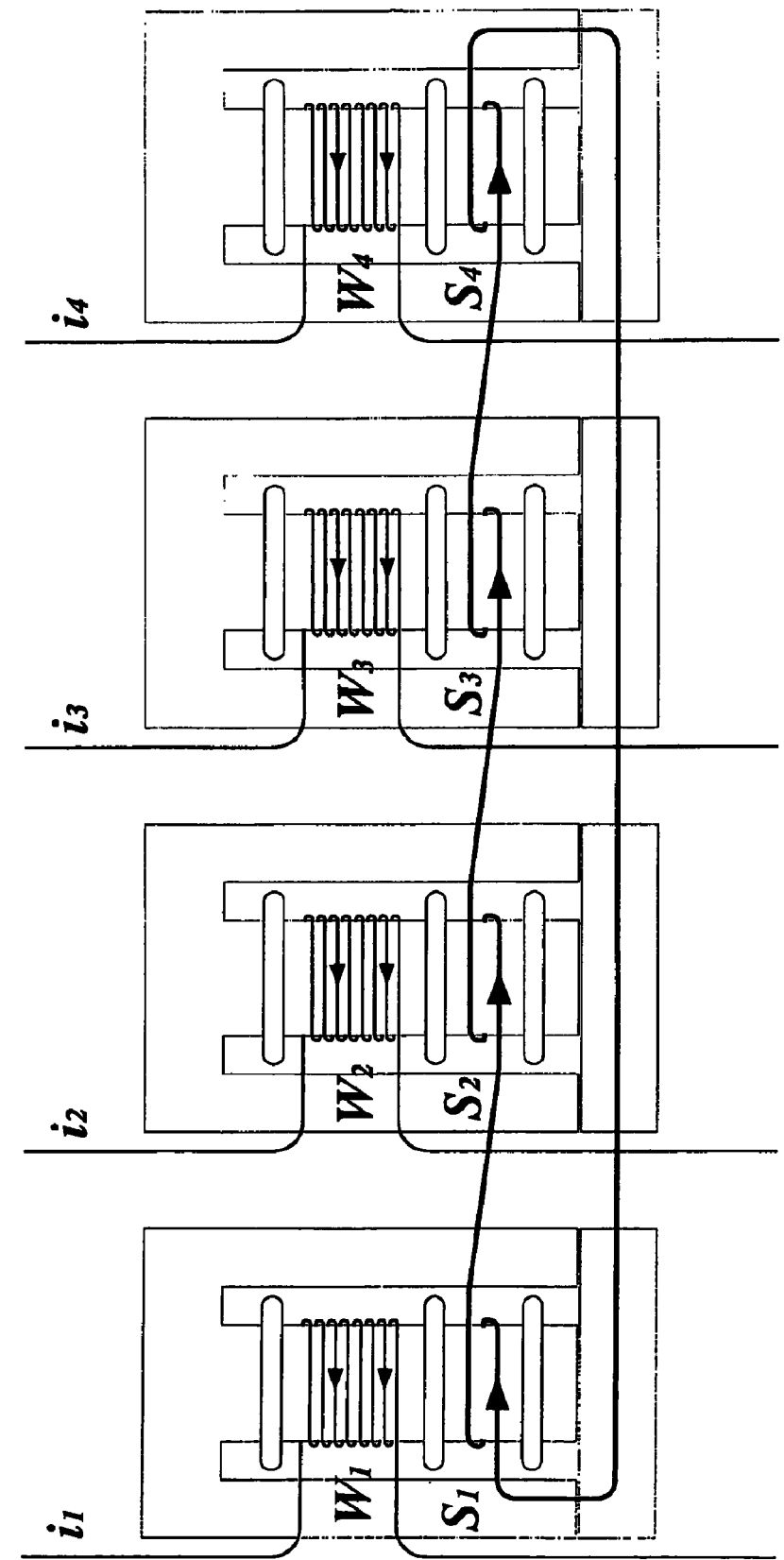
FIG. 15 is a structural diagram of a further different example showing the shunt circuit module for achieving shunt/balance effects according to the present invention.

The connection methods shown in FIG. 11 to FIG. 12 are based on claim 7, and the connection method shown in FIG. 15 in which shunt coils are independent of each other is also practical if based on the same technical idea. This connection method is also in the technical scope of claim 7 and preliminarily exemplified.

By having a plurality of the shunt circuit modules and connecting the short-circuit winding thereof mutually, more shunt/balance can be carried out.

Figure 13:
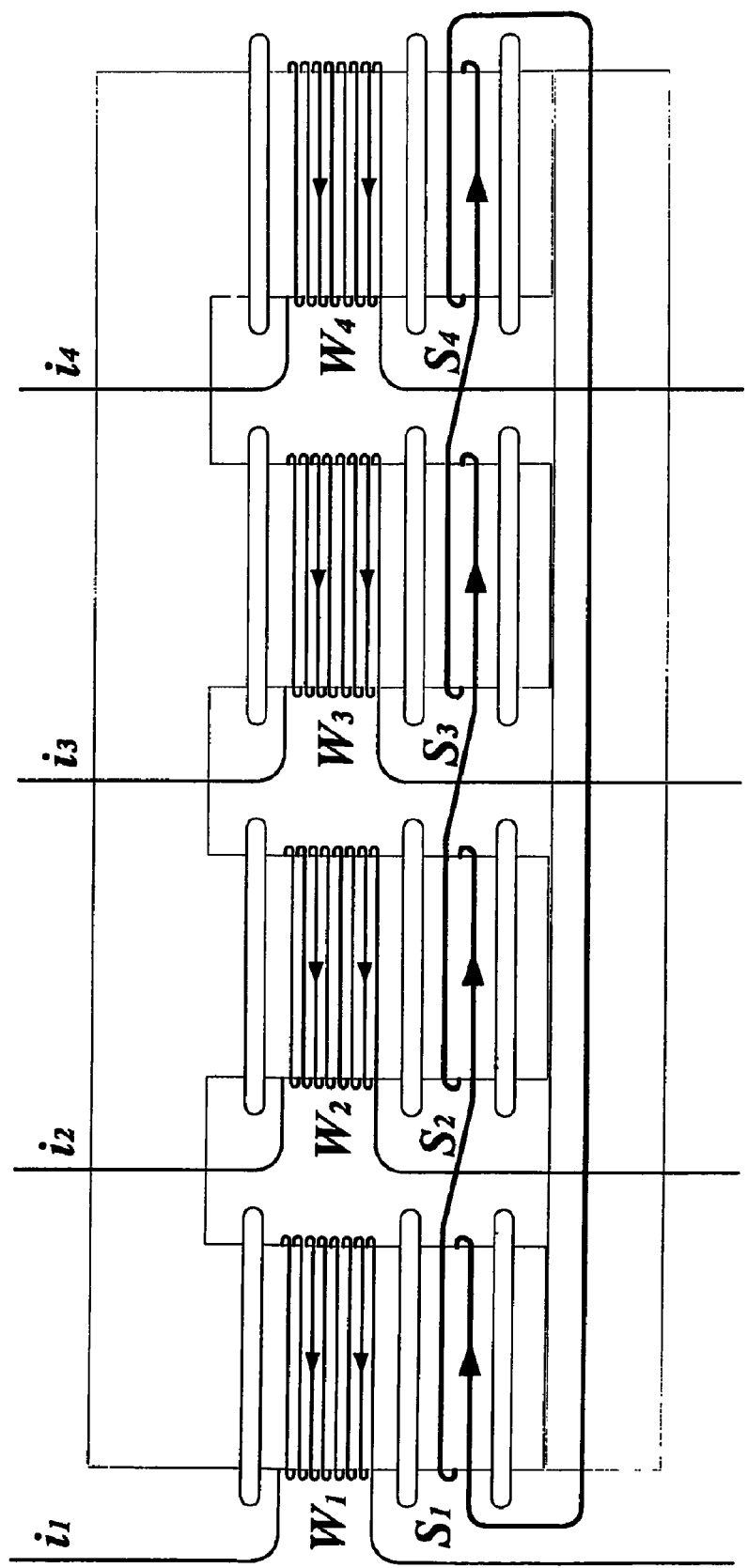
FIG. 13 is a structural diagram of still another example showing the shunt circuit module for achieving shunt/balance effects according to the present invention.

The similar principle is applicable to the example disclosed in FIG. 6 of the specification of Japanese Patent Application No. 2004-3740 (U.S. Patent application No. 2004-155596) (corresponding to FIG. 21 in this specification), and FIG. 13 shows its embodiment. Although FIG. 13 shows an example of four lamps, current can be shunted into a larger number of lamps.

Entirely the same as in the embodiments shown in FIG. 11 to FIG. 12, current can be shunted into a larger number of lamps by connecting the shunt circuit modules mutually.

Figure 14:
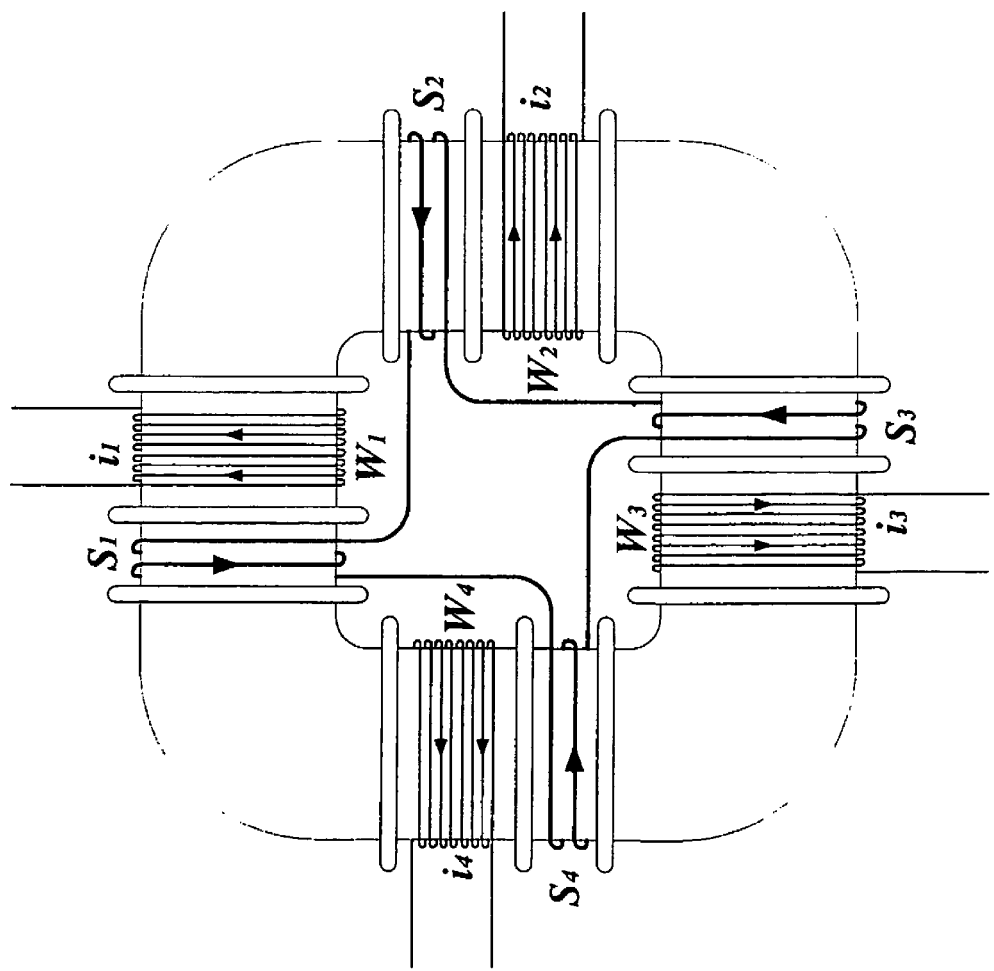
FIG. 14 is a structural diagram of a different example showing the shunt circuit module for achieving shunt/balance effects according to the present invention.

FIG. 14 showing a different embodiment in which a core is formed to be ring-shaped so as to uniform the magnetic conditions of each coil.

Although these principles are basically the same as those in FIG. 11 to FIG. 13, the magnetic uniformity of windings W1 to W4, short-circuit windings S1 to S4 does not have to be strict. If the mutual inductance ratios between windings W1 and short-circuit windings S1, windings W2 and short-circuit windings S2, windings W3 and short-circuit windings S3, and windings W4 and short-circuit windings S4 are correct, current equalizing effect becomes also correct.

In any of the above cases, it is needless to say that the self-resonance frequency generated by the self-inductance and distributed capacitance of the windings has to be sufficiently high, and that mutual inductance has to be large. Although these parameters are mutually in trade-off relation, section winding can break through the relation, which is one of the main ideas of the present invention.

Figure 16:
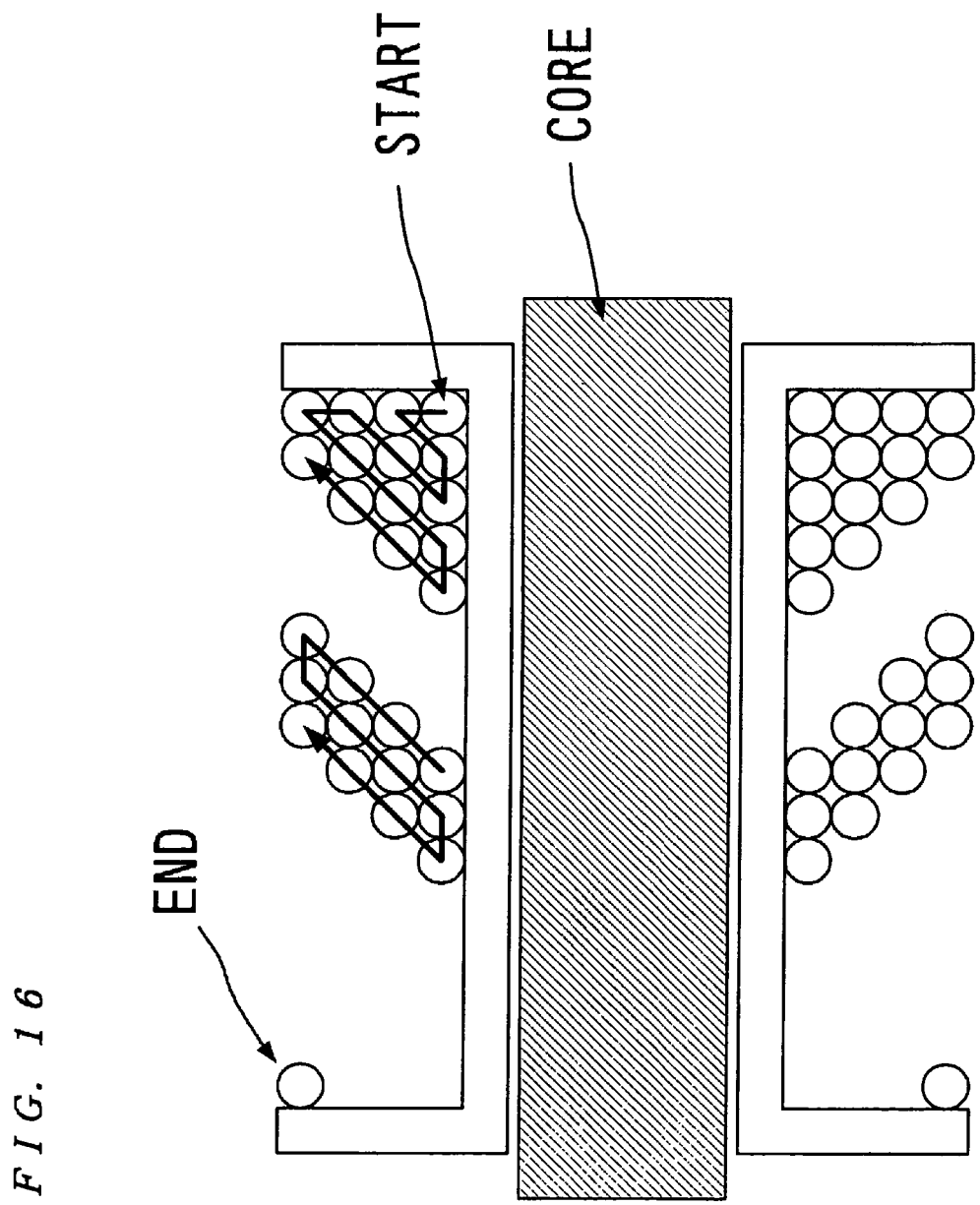
FIG. 16 is a conceptual diagram showing one example in which section winding in the shunt circuit is replaced with oblique winding according to the present invention.
Figure 17:
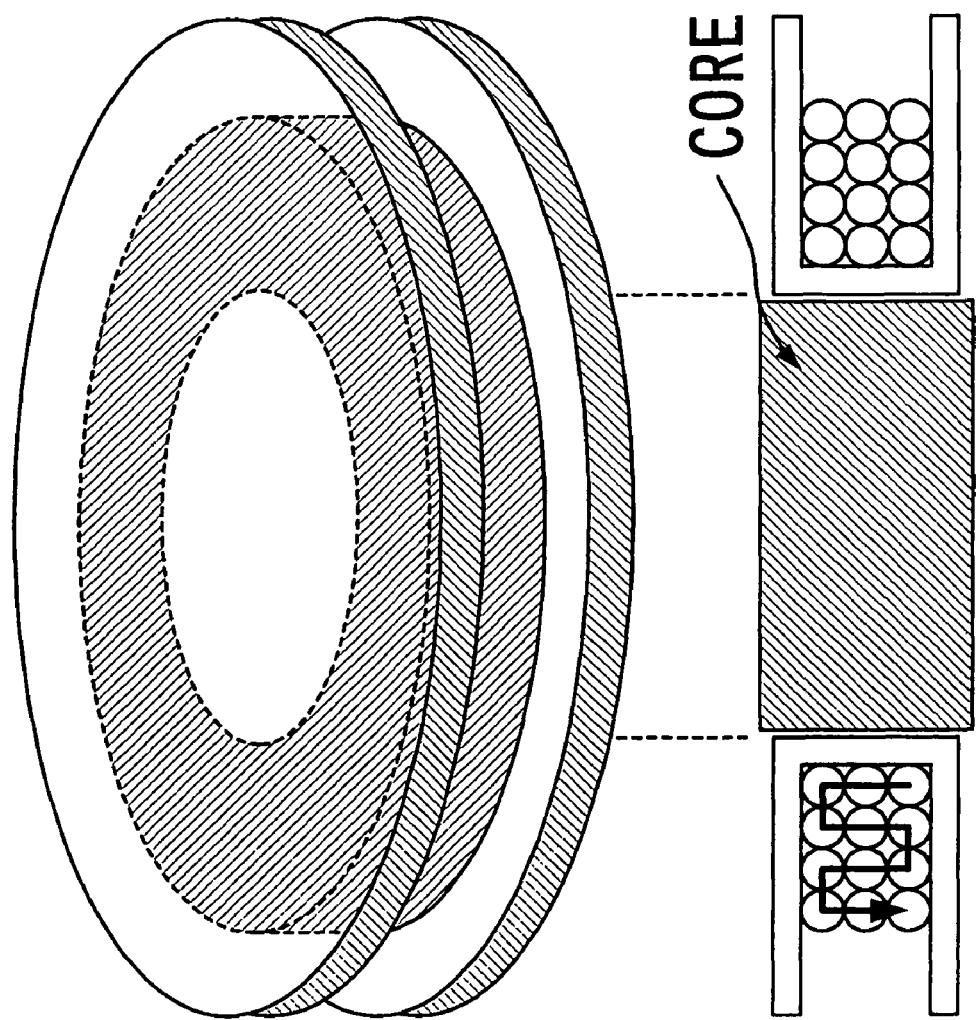
FIG. 17 is a conceptual diagram showing one example in which oblique winding in the shunt circuit is replaced with concentric winding according to the present invention.
Figure 18:
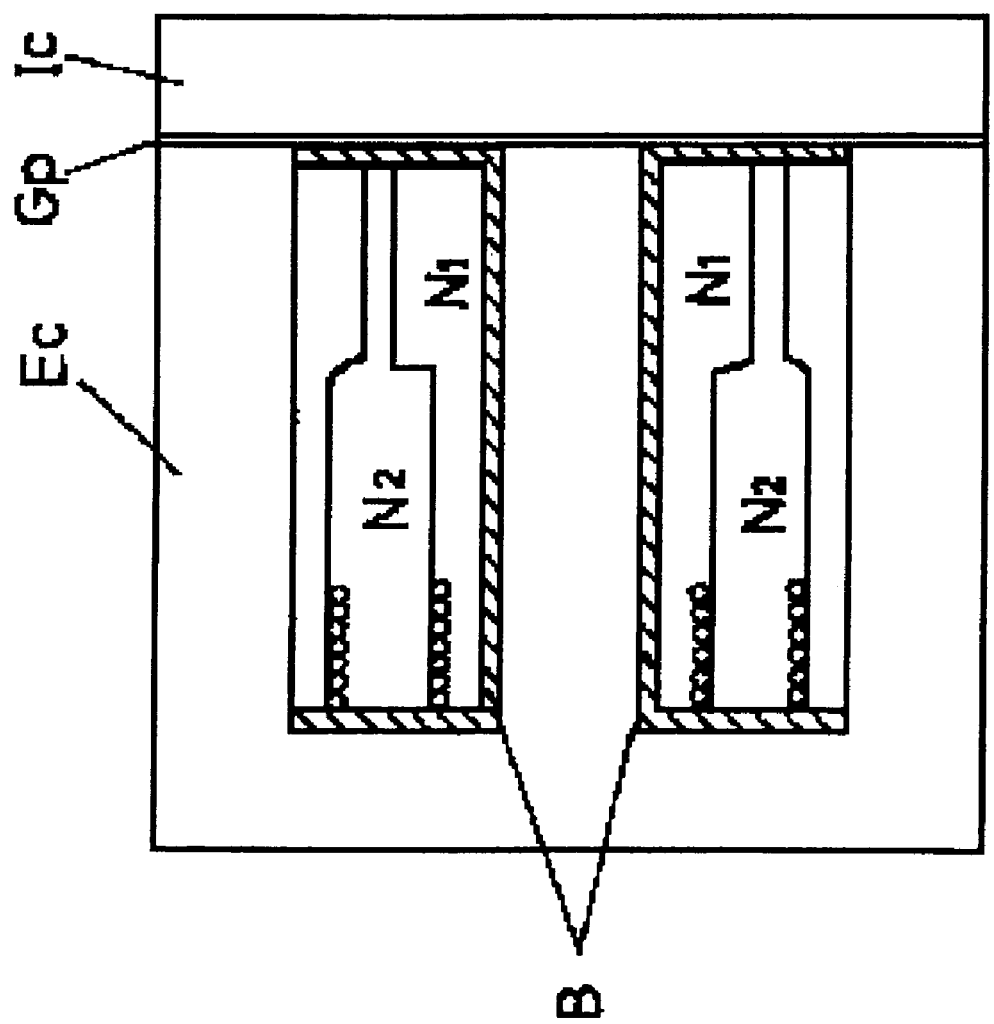
FIG. 18 is a structural diagram disclosing that in a balancer coil of a conventional cold-cathode florescent lamp, it is important to reduce inductance difference between coils N1, N2.
Figure 19:
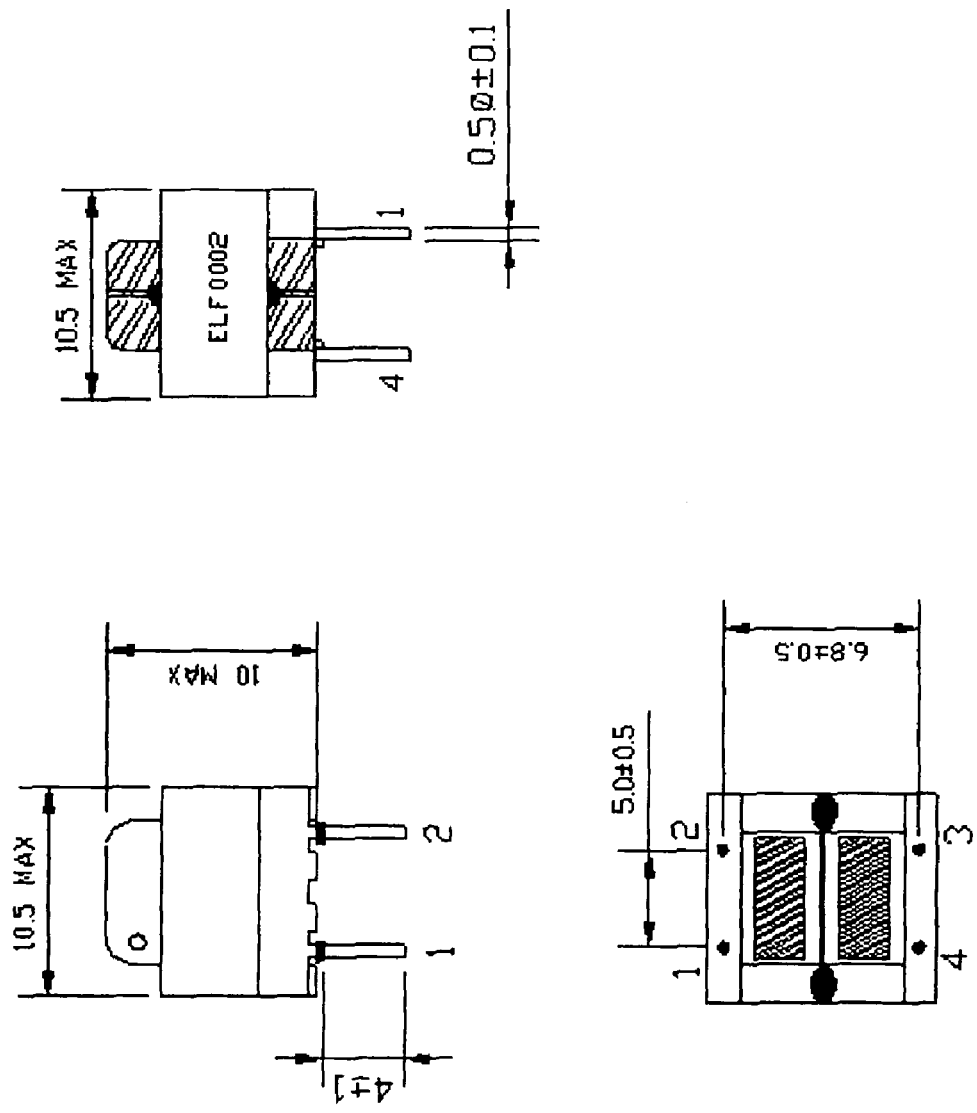
FIG. 19 is a structural diagram showing one example of a conventional balancer coil for cold-cathode florescent lamps which has been considered as the smallest.

Based on the similar idea, therefore, the embodiment shown below is also practical. Specifically, FIG. 16 shows a sectional view of windings by oblique winding and FIG. 17 shows a sectional view of windings by concentric winding. In FIG. 16, windings are wound up obliquely so as to be stacked, thereby bringing larger mutual inductance and higher self-resonance frequency compared in the same winding volume.

Figure 31:
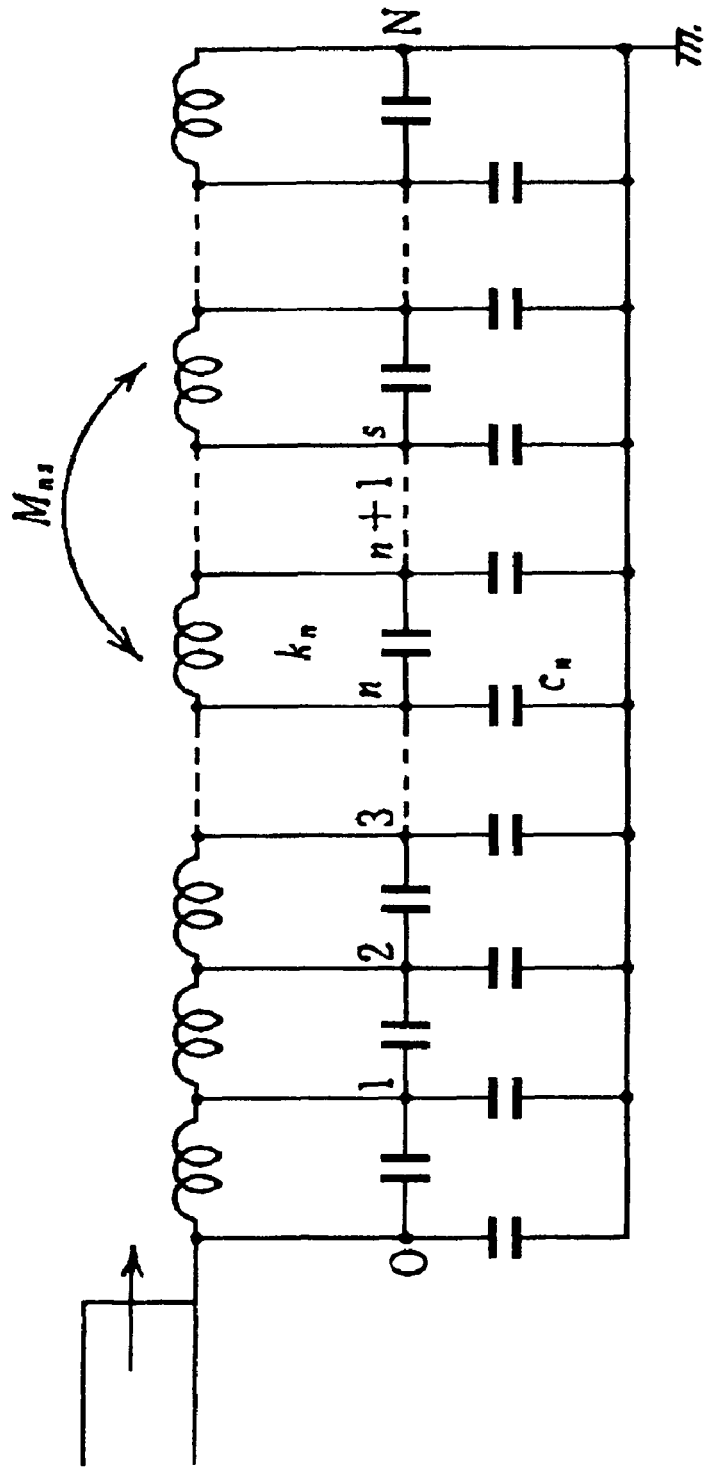
FIG. 31 is an explanatory diagram for explaining that an actual high-frequency coil is forming a delay circuit illustrated by the equivalent circuit structure by L and C in a state of a distributed constant ("Transformer in Power Device Course 5", 1966.4.30, Shichihei ASAKAWA, Sakae SHIMIZU).

In FIG. 17, windings are concentrically stacked so as to structure the inside of the windings by C and L in a state of a distributed constant as shown in FIG. 31. When the value L becomes larger, the phenomenon occurs that only a part of C can be seen as a general property of a distributed constant circuit, thereby making self-resonance frequency higher consequently.

(Operation)

The comprehensive principle of the shunt/balance operation in the balancer coil of the present invention will be described below.

In a 60 kHz inverter circuit for cold-cathode florescent lamps, the impedance of a cold-cathode florescent lamp C has a value in the range of about 100 kΩ to 150 kΩ in general. When the inductance values of coils L1, L2 of a shunt transformer Td are equal; the value is in the range of 100 mH to 200 mH; a shunt transformer Td is used whose coupling coefficient between the coils L1, L2 is 0.9 or larger, the mutual inductance value M is given by the following equation:

$$M = k \cdot Lo$$

For example, when a self-inductance is 100 mH, if a coupling coefficient is 0.9, the mutual inductance is given by:

0.9×100 mH=90 mH

If the reactance value of the mutual inductance at 60 kHz is given by:

$$X_L = 2\pi f L = 2 \times \pi \times 60 \times 10^3 \times 90 \times 10^{-3} = 34 \text{ k}\Omega$$

Under such conditions, two cold-cathode florescent lamps Z1, Z2 in the range of about 100 kΩ to 150 kΩ are shunted by the impedance, thereby bringing the balance of lamp current (see FIG. 32).

A contradiction now arises in the conventional theory. Specifically, based on the conventional theory, for the reactance of the balancer coil, a value several times as large as the impedance of the cold-cathode florescent lamp, that is, a reactance value in the range of 300 kΩ to 500 kΩ should be required at the operational frequency of the inverter (60 kHz). However, a considerably smaller reactance value than that is actually sufficient for obtaining balance/shunt effects.

That is, it is important for the reactance to exceed the negative resistance, which is the differentiated impedance of the cold-cathode florescent lamp C, and it is never required to fully exceed the impedance of a general cold-cathode florescent lamp (about 100 kΩ).

Accordingly, the difference in perspective between the conventional knowledge and the present invention will be described below.

The following conditions are required for the mutual inductance of a shunt transformer to act as reactance in an inverter circuit so as to lead to lighting.

Figure 26:
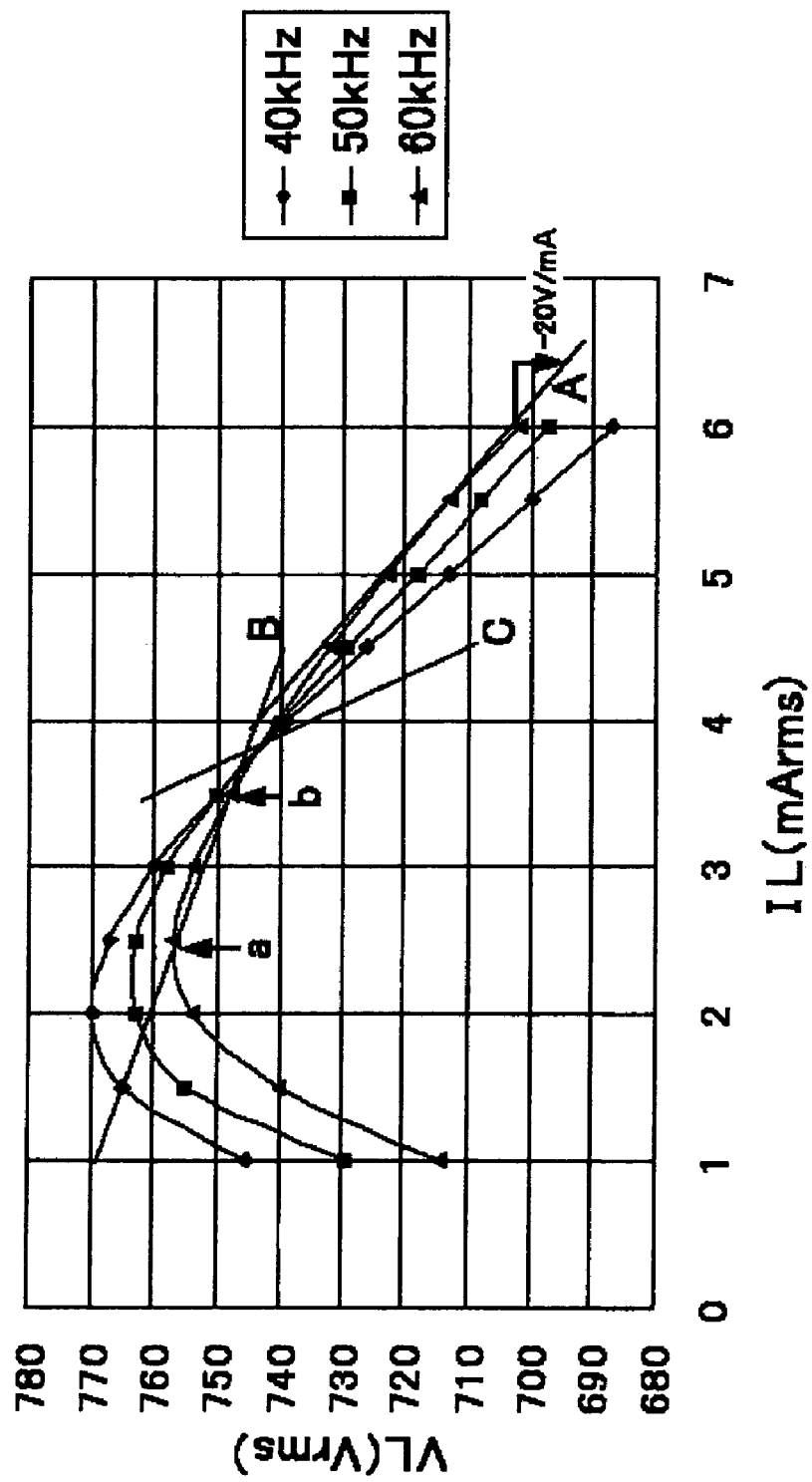
FIG. 26 is a voltage-current characteristic graph showing the discharge characteristic of a cold-cathode florescent lamp when the reflector placed close to the cold-cathode florescent lamp is conductive.

Generally, a cold-cathode florescent lamp has often been used for a liquid crystal backlight, in which case, when the reflector laid out adjacent to the cold-cathode florescent lamp is conductive, a proximity conductor effect is produced in the discharge characteristic of the cold-cathode florescent lamp to become the voltage-current characteristic as shown in FIG. 26.

The negative resistance value of the cold-cathode florescent lamp is expressed as the inclination angle of the voltage-current characteristic as shown in FIG. 26 (at 60 kHz). Taking FIG. 26 as an example, the value is −20 kΩ (−20V/mA).

If the reactance of the mutual inductance at the operational frequency of an inverter of a shunt transformer is shown for comparison by inverting the inclination angle, it becomes B or C. The reactance value of the mutual inductance in this case, since there are two windings in the shunt coil and the magnetic fluxes face each other, is twice as large as the reactance on one side.

In the case of B in which the reactance is smaller than negative resistance characteristic, there are two points of intersection (a, b) of the cold-cathode florescent lamp and the voltage-current characteristic. That is, when a lamp current increases for lighting, if one cold-cathode florescent lamp lights thereby increasing a current, the other cold-cathode florescent lamp advances to the negative resistance area on the right side in FIG. 26, the current of the cold-cathode florescent lamp connected to the other shunt transformer works in the direction of decreasing and advances to the positive resistance area on the left in FIG. 26. Thus, one cold-cathode florescent lamp lights whereas the other does not light.

In order to overcome such a phenomenon so as for the shunt transformer to light both cold-cathode florescent lamps, the reactance of the shunt transformer has to be like C so as to fully exceed at least the inclination angle of the negative resistance of the cold-cathode florescent lamp.

Specifically, in the example shown in FIG. 26, the reactance of the mutual inductance of the coil of one side of the shunt transformer has to exceed 10 kΩ, which is half of 20 kΩ.

Next, the influence of the self-resonance which suppresses shunt/balance effects will be described below.

Figure 24:
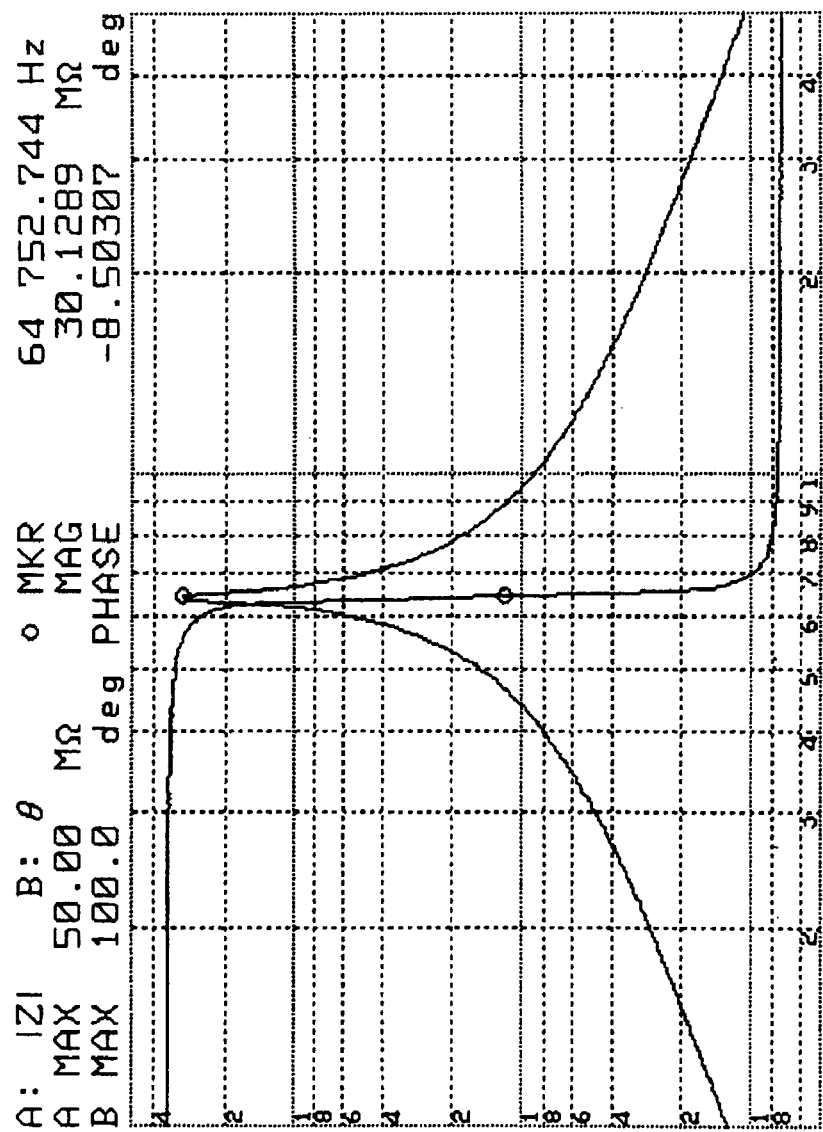
FIG. 24 is a graph showing one example in which, conventionally, a larger number of turns of winding of each coil of a balancer coil so as to secure shunt/balance effects increases inductance, but the self-resonance frequency of the coil becomes lower in exchange, thereby losing shunt/balance effects.
Figure 25:
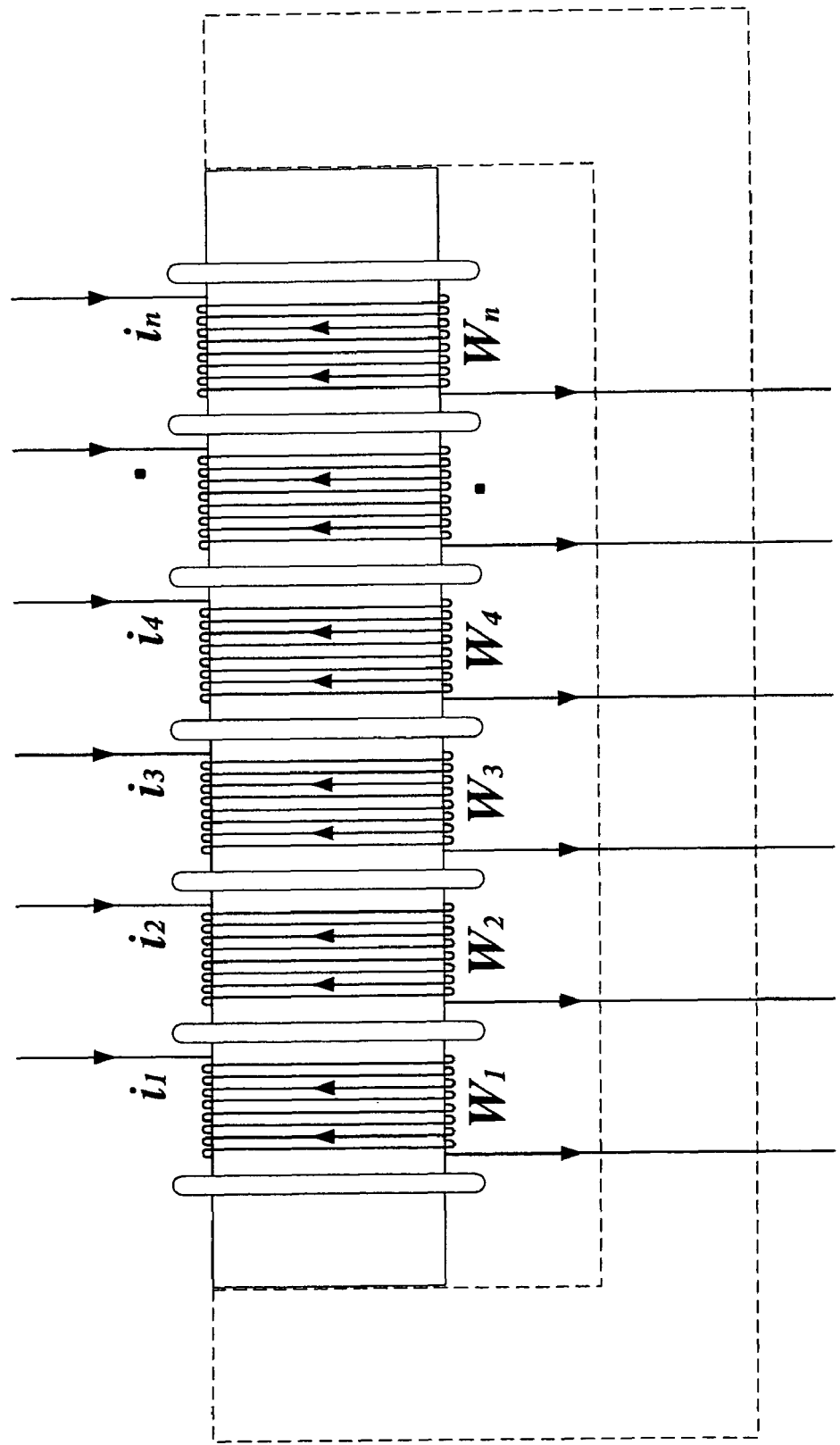
FIG. 25 is a structural diagram showing an example of a conventional shunt circuit module which can obtain balance/shunt effects by windings wound up around single core.

FIG. 24 shows a pilot test wound up as a balancer coil, in a very unstable state where shunt/balance effects are sometimes obtained and lost. Observe the self-resonance phenomenon of windings using an impedance analyzer, the self-resonance frequency is about 64 kHz. A balancer coil, if used at a higher frequency than the self-resonance frequency, a shunt balance effect cannot be obtained at all. This is because the distributed capacitance generated in the windings of the each coil work as an equivalent to the capacitance connected to the windings in parallel.

Generally, since the operational frequency of an inverter circuit for cold-cathode florescent lamps has been regarded as 45 kHz to 60 kHz recently, FIG. 24 shows the limit, in which if the resonance frequency should become equal to or lower than the operational frequency of the inverter due to the variations in the inductances of core material, shunt/balance cannot be carried out. In this case, if section winding is applied to each coil, the self-resonance frequency becomes higher. Then, the more division numbers for section winding, the lower coupling coefficient becomes. In this case, the value obtained by multiplying the self-inductance L1 (or L2) of each coil by coupling coefficient becomes mutual inductance. The leakage inductance Le (IEEJ) is the value obtained by multiplying self-inductance by (1−k). The leakage inductance in this case does not suppress shunt/balance operation. Therefore, it is more advantageous to make self-resonance frequency higher in order to secure shunt/balance operation even though decreasing coupling coefficient.

Since the effective magnetic permeability of the core becomes lower when downsizing the balancer coil, thinner wires and a larger number of turns are necessarily required for a larger inductance, which causes decrease in self-resonance frequency.

Therefore, even a small balancer coil can make self-resonance frequency higher by applying section winding. It is known that section winding essentially makes coupling coefficient lower.

The balancer coil of the present invention, however, allows split winding with a larger number of the sections of each coil of the balancer coil by excluding the technical idea that the essential factor of shunt/balance operation lies in mutual inductance and is coupling coefficient.

In a high-frequency balancer coil used for high-voltage, each coil expresses the property of a delay circuit in a state of a distributed constant, and the influence becomes more noticeably as closer to self-resonance frequency of each coil.

FIG. 31 shows an equivalent circuit of the actual high-frequency coil shown in the literature "Transformer in Power Device Course 5" (published by The Nikkan Kogyo Shimbun, Ltd.). Since such a delay circuit is formed in a high-frequency coil, progressive wave and standing wave are generated on the windings. In order to obtain favorable shunt/balance effects in a balancer coil for cold-cathode florescent lamps, the influence of the progressive wave has to be considered.

FIG. 29 will be taken as an example for description as follows.

A terminal 2 of the balancer coil is the beginning of winding, in which case, the coil is wound up from the circumference toward the center. The end of wiring is fixed to a terminal 1. The beginning of winding of the other coil starts from the terminal 4 being wound up toward the center, and the end of wiring is fixed to a terminal 3. When using the balancer coil, the terminals 1 to 3 are short-circuited, so that a shunted current flows in the direction of the arrow thereby generating magnetic fluxes in the center core. Since these magnetic fluxes generate in the direction of canceling each other, the magnetic fluxes cancels out each other.

There exists another kind of magnetic flux generated in a high-frequency coil, however. In the coil on the opposing side seen from each coil, that is, the coil corresponds to secondary windings, progressive wave is generated. The windings firstly acted on by progressive wave have to be symmetrical in a balancer coil. In the example shown in FIG. 29, however, the windings connected to the terminals 1 and 3, that is the windings in the section close to the center receives the operation.

Figure 27:
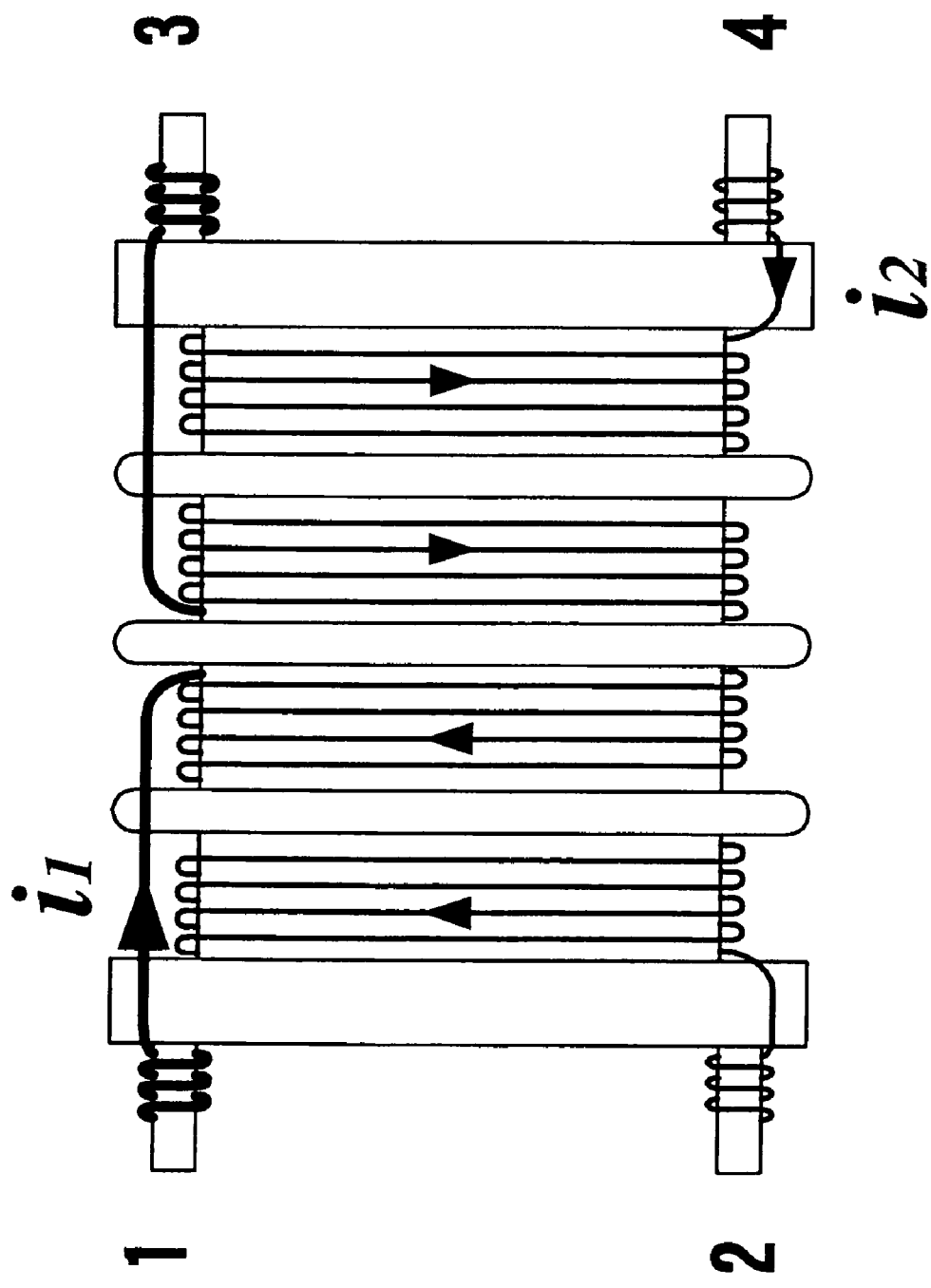
FIG. 27 is a structural diagram showing one example of wiring of the balancer coil.

In the case of the windings as shown in FIG. 27, the windings firstly acted on by the progressive wave generated by a current $i_1$ of primary windings is the windings connected to the terminal 3. The terminal 4 receives the operation of the temporally delayed progressive wave. Therefore, when short-circuiting terminals 1 to 4 and making a balancer coil so as to structure a shunt circuit in such a winding structure, the magnetic flux component generated in the core becomes more unbalanced as closer to self-resonance frequency of the windings, and the magnetic flux component which is not canceled remains.

In view of the above, it is important to apply winding as shown in FIG. 29 so as to cancel magnetic fluxes including the influence of progressive wave. It is to be noted that these are not reflected on the illustration of an actual electronic circuit.

Since an electronic circuit is illustrated by simplification, it is often the case that there is no way of illustrating these parasitic effects. Therefore, it is the most important, in a balancer coil for cold-cathode florescent lamps, to consider the effects which are not reflected on a circuit diagram, such as parasitic capacitance and a distributed constant circuit.

(Effect)

Next, the effect of the short-circuit winding shown in FIG. 11 to FIG. 14 will be described.

When currents flow in the same direction through the shunt coils of windings W1 to W4 as shown in each drawing, the magnetic fluxes generated from these coils generate the current in the shown direction with respect to short-circuit winding S1 to S5 (or S4).

The magnetic fluxes generated in the core by the currents flowing through the short-circuit windings S1 to S5 (or S4) are canceled since facing the magnetic fluxes generated by the windings W1 to W4.

Since the short-circuit windings S1 to S5 (or S4) are mutually connected, the generated magnetic fluxes are made equal by the currents flowing through the windings. Since the magnetic fluxes canceled by facing the magnetic fluxes are also made equal consequently, the currents flowing through the windings W1 to W4 are also balanced.

For a large liquid crystal display television, a flat balancer coil 6.5 mm thickness has been achieved.

In the example disclosed in the present invention, self-resonance frequency is 120 kHz or above; sufficient shunt/balance effects have been obtained at the operational frequency of the inverter circuit; and a larger inductance value can be complied with.

The breakdown voltage between coils has become high.

The sufficient downsizing can reduce the heat generated by the core saturation when the lamp currents are unbalanced in the invention of Japanese Patent Application No. 2004-3740 (U.S. Patent application No. 2004-155596).

A highly accurate current equalizing effect has been achieved by considering the leakage current caused by parasitic capacitance.

In a small balancer coil, by considering the delay time of progressive wave, shunt/balance effects have been improved also near the self-resonance frequency.

By arranging the circuit in a tournament tree shape physically, the current balance has further been improved.

Further, by considering the parasitic capacitance of wiring, the current balance has further been improved.

Since integration into one module is carried out as a shunt circuit module, downsizing of the shunt circuit module has been realized.

What is claimed is:

1. A shunt circuit module comprising a plurality of balancer coils and short-circuit windings wound up adjacent to windings of the balancer coil, wherein the short-circuit windings are mutually and circulatingly connected so as to generate magnetic fluxes from windings of the balancer coil, the generated magnetic fluxes facing each other such that the generated magnetic fluxes are canceled out, and wherein the current flowing through the balancer coil is balanced by the magnetic fluxes being canceled out.

2. The shunt circuit module according to claim 1, wherein section winding is applied to at least one part of the windings of the balancer coils so as to make self-resonance frequency of the windings higher.

3. The shunt circuit module according to claim 1, wherein oblique winding is applied to at least part of the windings of the balancer coils so as to make self-resonance frequency of the windings of each of the balancer coils higher.

4. The shunt circuit module according to claim 1, wherein concentric winding is applied to at least part of the windings of the balancer coils so as to make self-resonance of the windings higher.

* * * * *